United States Patent
Yoshinaka et al.

(10) Patent No.: US 7,196,981 B2
(45) Date of Patent: Mar. 27, 2007

(54) OPTICAL DISC APPARATUS

(75) Inventors: Hideki Yoshinaka, Chikushino (JP); Shogo Horinouchi, Fukuoka (JP); Shin Ishibashi, Fukuoka (JP); Fuminobu Furukawa, Onojo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 543 days.

(21) Appl. No.: 10/390,776

(22) Filed: Mar. 19, 2003

(65) Prior Publication Data

US 2003/0179667 A1   Sep. 25, 2003

(30) Foreign Application Priority Data

Mar. 20, 2002  (JP) .............................. 2002-078391

(51) Int. Cl.
*G11B 7/095*   (2006.01)
(52) U.S. Cl. .................. 369/44.41; 369/112.16
(58) Field of Classification Search ............ 369/44.41, 369/112.16; *G11B 7/00, 7/095*
See application file for complete search history.

(56) References Cited

U.S. PATENT DOCUMENTS

| | | |
|---|---|---|
| 4,533,826 A | 8/1985 | van Alem |
| 4,945,529 A | 7/1990 | Ono et al. |
| 5,648,951 A | 7/1997 | Kato et al. |
| 6,512,732 B1 | 1/2003 | Bierhoff et al. |
| 6,928,035 B2 * | 8/2005 | Komma et al. .......... 369/44.37 |

| | | |
|---|---|---|
| 2001/0046195 A1 | 11/2001 | Togashi |

FOREIGN PATENT DOCUMENTS

| | | |
|---|---|---|
| EP | 0374841 | 6/1990 |
| EP | 0452793 | 10/1991 |
| JP | 07311989 | 11/1995 |
| JP | 08161768 | 6/1996 |
| JP | 11219529 | 8/1999 |
| JP | 2000251305 | 9/2000 |
| JP | 2001250343 | 9/2001 |

* cited by examiner

*Primary Examiner*—A M Psitos
(74) *Attorney, Agent, or Firm*—Stevens, Davis, Miller & Mosher, LLP

(57) ABSTRACT

Provided is a focus and tracking control method for an optical pick-up apparatus which is used for recording and reproduction of a small-sized optical disc and which can carry out stable focus control and stable tracking control. A focus control method for an optical pick-up apparatus comprising a light source, an objective lens, a light receiving means having divided four light receiving zones and a polarizing means having divided for lattice zones, characterized in that when the reflected light beam is incident upon the four light receiving zones by way of the four lattice zones, focus control is carried out in accordance with a difference signal between the groups, in the radial direction, of the four light receiving zones which are divided into two groups in the radial direction by the division line in parallel with the tangential direction, respectively through the four lattice zones which are divided into two groups in the tangential direction by a division line in parallel with the radial direction. Further, the tracking control for the pick-up apparatus is characterized in that tracking control is carried out in accordance with a difference signal between two groups in the tangential direction.

3 Claims, 16 Drawing Sheets

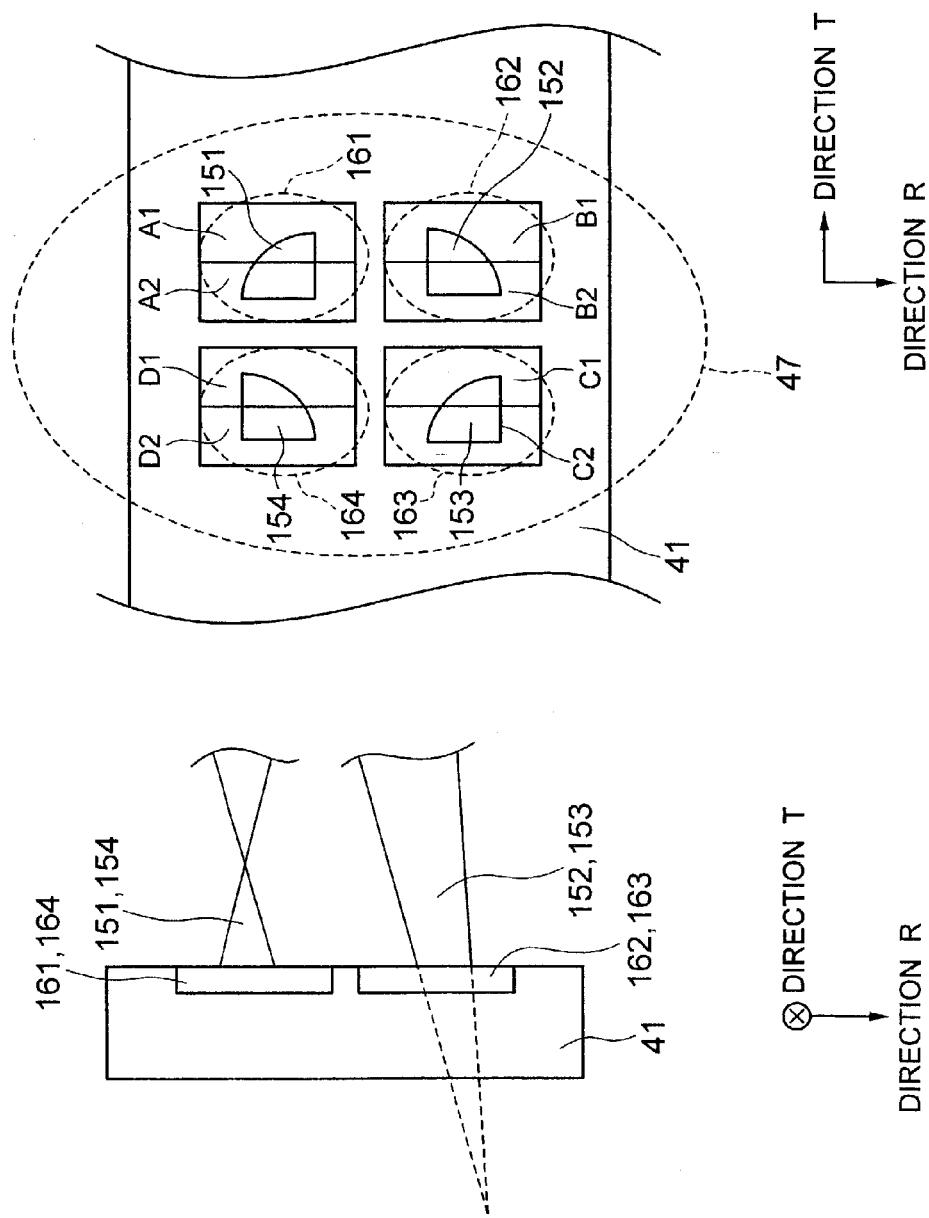

OPTICAL DISC APPARATUS

BACKGROUND OF THE INVENTION

The present invention relates to a control method of focus and tracking, using a pickup apparatus for detecting optical signals appropriate for recording and reproduction of an optical disc.

FIELD OF THE INVENTION

There have been prosperously used optical disc units as storage devices for computer units since they have a large memory capacity. Further, miniaturization of computer units and development of mobile type thereof inevitably have caused the optical disc units used therein to become relatively small-sized. Typically, as to minidisk (MD) units, pick up apparatus used therein has been practically used, as disclosed in JP-A-7-31198, JP-A-8-161768 and the like.

Meanwhile, as to hard disc units, increased recording capacity and miniaturization have been advanced, and, accordingly, the hard disc units have been widely used in mobile type computer units. These hard disc units utilize a magnetic head as disclosed in JP-A-2001-250343.

Meanwhile, the optical disc is in general the one which data can be recorded on or reproduced from by means of a light beam, and is of any of various type irrespective of a recording type using degrees of recording density, wavelengths of light beams, photomagnetism and the like, a shape of discs such a disc shape or a name-card shape, a package type such as a fixed type or a jacket type or a replaceable type.

However, in view of a wide-spread use of mobile type computers, a development of mobile type communication units and commercial demands for further miniaturization, and proposal of new IT business, there have been presented commercial demands for further miniaturization.

SUMMARY OF THE INVENTION

Accordingly, in view of the above-mentioned commercial demands, the present invention proposes a control method for an optical pick-up apparatus at a new view point, and an object of the present invention is to provide a control method of focus and tracking in an optical pick-up apparatus, which can carry out stable focus control and tracking control.

To the end, according to the present invention, there is provided a focus control method for an optical pick-up apparatus comprising a light source, an objective lens, a light receiving means having four divided light receiving zones, for receiving a reflected light beam from a recording medium, and a polarizing means having four divided lattice zones and located between the objective lens and the light receiving means, when the reflected light beam is incident upon the four light receiving zones after passing through the divided four lattice zones, characterized in that focus control is carried out in accordance with a difference signal between two groups of the four light receiving zones, which are divided in the tangential direction by a division line which is in parallel with the radial direction of the recording medium, by way of two groups of the four lattice zones which are divided in the tangential direction by a division line which is in parallel with a radial direction of the recording medium.

With this arrangement, detection of optical signals appropriate for recording and reproduction of a small-sized optical disc can be carried out, thereby it is possible to provide a focus and tracking control method for an optical pick-up apparatus with no affection by slanting of a disc and variation in environmental temperature, and as well to provided an optical pick-up apparatus using these control methods.

Explanation will be hereinbelow made of embodiments of the present invention with reference to the drawings in which:

BRIEF DESCRIPTION OF SEVERAL VIEWS OF THE DRAWING

FIG. 10 is a view for explaining a relationship between a received light pattern and a return incident light beam;

DESCRIPTION OF THE PREFERRED EMBODIMENTS (Embodiment 1)

Figure 1:
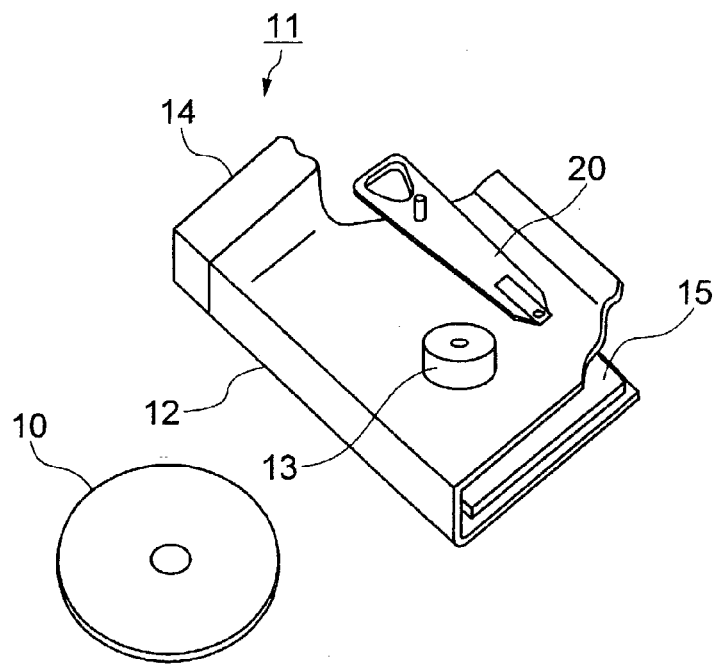
FIG. 1 is a perspective view illustrating an essential part of an optical disk unit.

Referring to FIG. 1 which is a perspective view illustrating an essential part of an optical disc unit 11 in an embodiment 1 of the present invention and in which a housing is broken in order to manifest the main object of the present invention, there are shown an optical disc 10 used in the optical disc unit 11 according to the present invention, and having a diameter which is smaller than that of an MD so as to conveniently use the disc in a mobile type disc unit, a housing 12 for protecting the optical disc unit 11 and holding therein several components, the housing 12 having an opening (which is not shown) through which the optical disc 10 can be loaded and unloaded.

Further, there are shown a spindle motor 13 for rotating the optical disc 10 mounted thereon, an IF unit 14 for transmitting and receiving signals to be recorded onto or reproduced from the optical disc 10, to and from an external equipment, which is a connector or a modem for wiring connection or a unit for wireless communication, and a control board 15 for controlling the optical disc unit in its entirety, and for driving several components.

Figure 2:
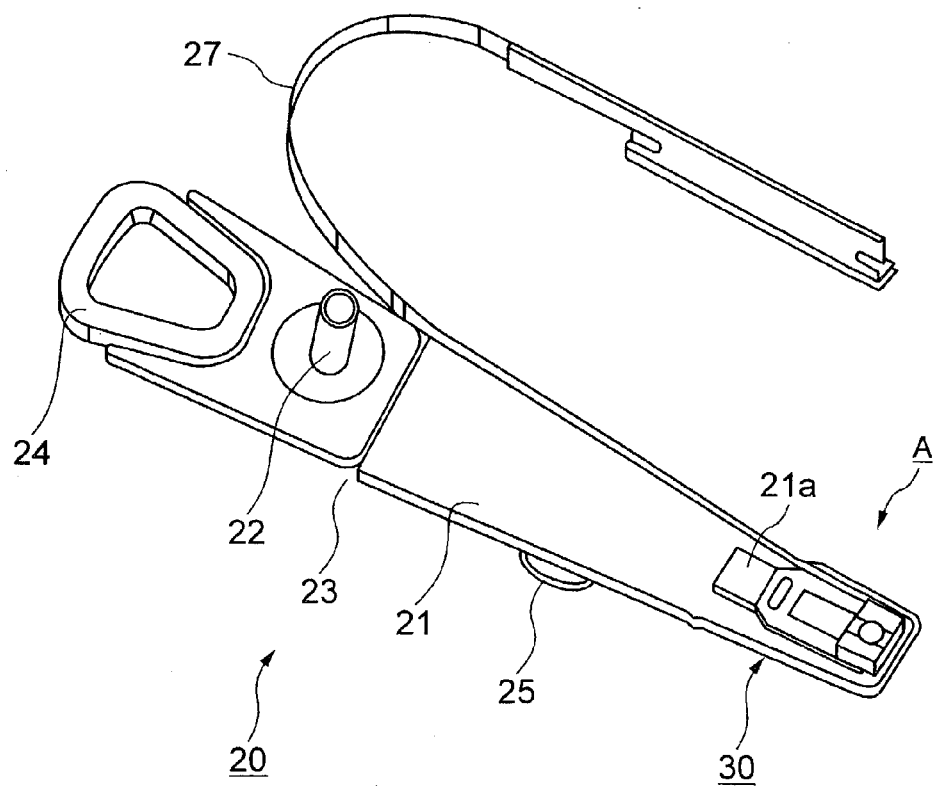
FIG. 2 is a perspective view illustrating an essential part of an optical pick-up (swing-arm) shown in FIG. 1.

Further, an optical pick-up (swing arm) 20 is adapted to swing over the recording surface of the loaded optical disc 10 from its inner periphery to its outer periphery. It is noted that the term of this optical pick-up will be used in a functional representation but will be sometime referred to as a swing an in view of its mechanical function. Referring to FIG. 2 which is a perspective view illustrating an essential part of the optical pick-up (swing arm) 20 shown in FIG. 1, there are shown an arm 21 serving as a swinging means, which is entirely rigid in order to ensure a precise position of an optical system, a shaft 22 serving as a fulcrum for swing motion of the swing arm 21 which is journalled to the housing 12 through the intermediary of the shaft 22, and a hinge 23 which is a sole flexion part of the rigid arm 21 so as to precisely control the motion of the arm 21 to and from the optical disc 10 (focusing motion).

Further, there are shown a tracking coil 24 serving as a swing drive means, and a focus coil 25 serving as a motion drive means. By energizing the tracking coil 24, attraction and repulsion are induced with respect to a magnet (which is not shown) provided in the housing 12, and accordingly, the arm 21 is swung from the inner periphery to the outer periphery of the optical disc 10 around the shaft 22 as a fulcrum. Further, attraction and repulsion are also induced by the focusing coil 25 with respect to a magnet (which is not shown) provided in the housing 12 in order to cause the arm 21 to carry out focusing motion around the hinge 21 as a flexion point. Signals are transmitted through a flexible cable (which will be hereinbelow abbreviated as FPC) 27 for electrical connection among the tracking coil 24, the focusing coil 25, an optical head which will be detailed later, and the control board 15.

Figure 3A:
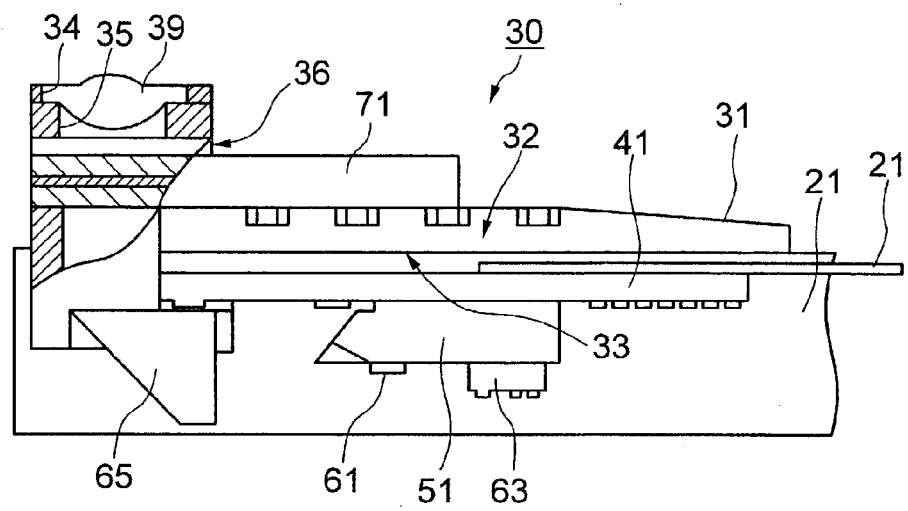
FIG. 3A is a sectional view illustrating, in general, an optical head shown in FIG. 2.
Figure 3B:
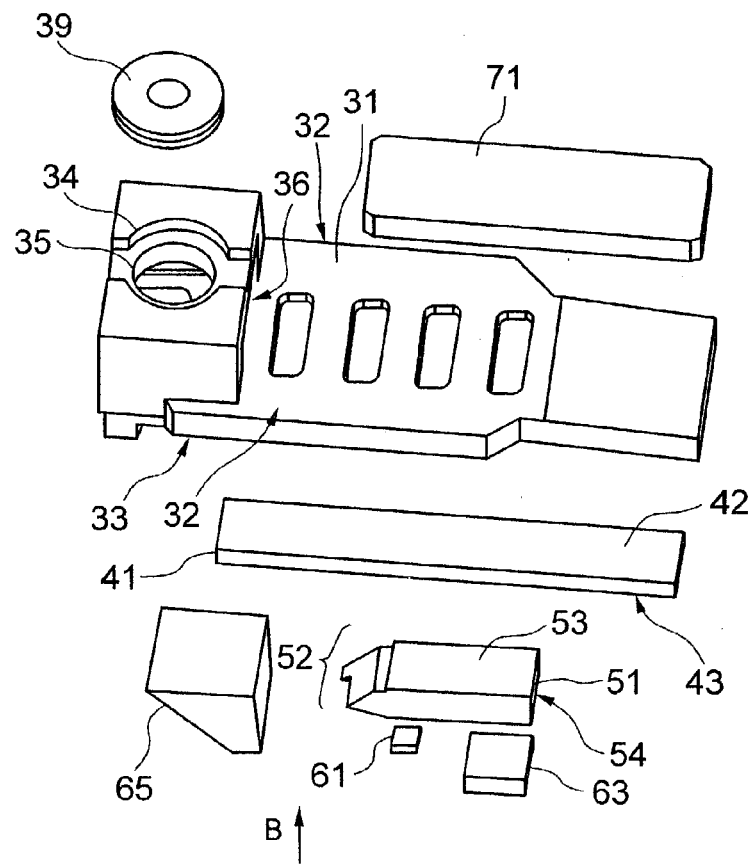
FIG. 3B is a perspective view illustrating the optical head shown in FIG. 2.

The arm 21 is formed in its distal end part with a rectangular aperture 21a in which an optical head 30 is fixed. The optical head 30 is shown in FIGS. 3A and 3B in its entirety. FIG. 3A is a side view as viewed in a direction indicated by the arrow A in FIG. 2, and shows therein a structure of the arm 21 in a part which indicated by the arrow A in FIG. 2 and which is broken away. In FIG. 3A, the direction normal to the figure is radial of the optical disc 10, and the direction lateral to the figure is tangential to the optical disc 10. FIG. 3B is an exploded perspective view in which the arm 21 is not shown in order to facilitate the understanding of the structure.

Referring to these figures, there is shown a holder member or a lens holder 31 which is fixed to the arm 21 and which is a main structure for holding all optical components including an objective lens 39. Planar flange parts 32 are formed being horizontally bulged from both sides of the lens holder 31. The lower surfaces 33 of the flange parts 32 are fixed to the aperture 21a of the an 21 by means of adhesive or the like. It is noted that explanation will be made for the sake of brevity in such a way that the front surface side corresponds to the side facing the optical disc 10 while the rear surface side corresponds to the side remote from the optical disc 10.

The distal end part of the lens holder 31 is projected toward the optical disc 10 so as to be in a portal shape. The portal shape distal end part is formed therein with a circular shoulder part which serves as a holder part 34 for fixing thereto the objective lens 39 and a circular through-hole 35 which serves as an optical guide path for light passing through the objective lens 39.

This circular through-hole 35 has a diameter which is set so that the objective lens 39 has a desired NA. Accordingly, the circular through-hole 35 also serves as a lens aperture member for the objective lens 39. Further, since it is integrally incorporated with the holder part 34 for fixing the objective lens 39, no positional adjustment between the objective lens 39 and the lens aperture member is required, thereby it is possible to assemble the optical head with a high degree of accuracy at a low manufacturing cost.

Both legs of the projected portal shape part define therebetween a space orthogonal to the circular through-hole 35. This space serves as a polarizing plate mounting part 36 for mounting a polarizing plate 71 which will be explained later. The lens holder 31 is formed on its rear surface side with a shoulder part in its distal end part and a planar part in its center part. The shoulder part in the distal end part servers as a mirror fixing part 37 for fixing a reflection mirror 65 which will be explained later. An OEIC 41 serving as a light receiving means is mounted to the planar part. The OEIC 41 is planar so as to have a fixing surface 42 on the front surface side, which is fixed to the lens holder 31 and a wiring surface 43 on the rear surface side.

The OEIC 41 is mounted thereon with a submount 51 serving as a heat radiation member. The submount 51 is planar, having an oblique surface in its distal end part, and having planar surfaces one of which serves as a fixing surface fixed to the OEIC 41 on the front surface side and the other one of which serves as a mounting surface 54 on the rear surface side. The mounting surface 54 is mounted thereon with a semiconductor laser 61 as a light source and an HFM (high frequency module) 63. The HFM 63 is a module which subjects the semiconductor laser 61 to high frequency modulation so as to drive the same, and is, in general, mounted in such a way that it is isolated from or shielded from a signal detection system since its processes high-frequency currents. Since the HFM 63 is mounted to the submoutn 51, both isolating function and shielding function can be automatically obtained.

Figure 4:
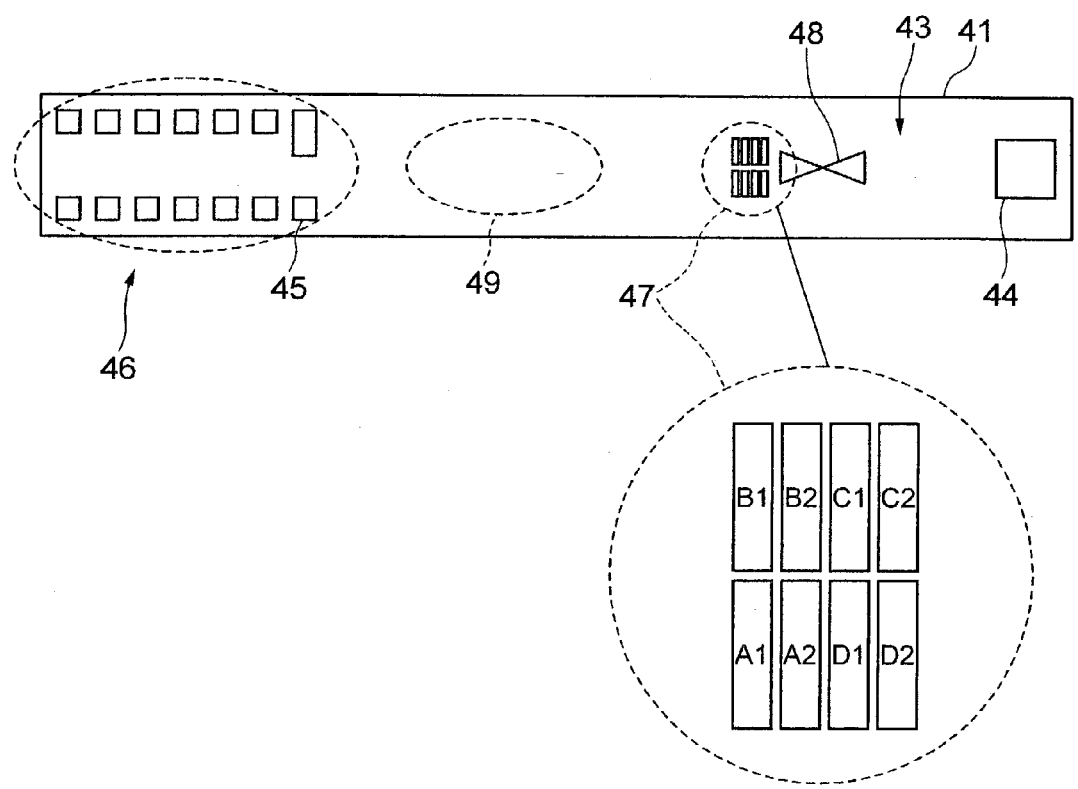
FIG. 4 is an enlarged plan view illustrating an OEI.

Referring to FIG. 4 which is an enlarged wiring diagram showing a system circuit 43 in the OEIC 41 as viewed in a direction indicated by the arrow B in FIG. 3B, there are shown a monitor light receiving part 44 for detecting an output power (optical power) of a light beam emitted from the semiconductor laser 61 in order to control the output power of the semiconductor laser 61, and terminals 45 for wiring a power source line, signal lines and the like, which are bundled and arranged in a terminal part 46 so as to enhance the efficiency of a wire bonding work, and a detecting light receiving part 47 serving as a light receiving means, and having a plurality of light receiving elements arranged therein, as shown in an enlarge view, for producing reproduction signals, and control signals for focusing and tracking in accordance with a light beam reflected from the optical disc 10.

It is noted that the OEIC 41 may be formed by cutting a silicon wafer in a rectangular shape or the like. With this configuration, required light receiving elements (the monitor light receiving part 44 as the monitor light receiving element and a received light receiving part 47 as a light receiving means), current-voltage converting elements (for example, resistors or the like) therefor, signal amplifiers and required internal wirings may be previously incorporated in the silicon substrate (OEIC 41).

Further, although the explanation has been made of such an example that the HFM 63 is mounted on the submount 51, the HFM 63 may be mounted on the OEIC 41, or incorporated within the silicon wafer for the OEIC 41 in the form of an integrated circuit. Further, there is shown a reference marker 48 which is used for precisely determining the mounting positions of the submount 51 and the semiconductor laser 61. A planar space defined in the center part serves as a mount mounting part 49 to which the fixing surface 53 of the submount 51 is fixed.

Figure 5:
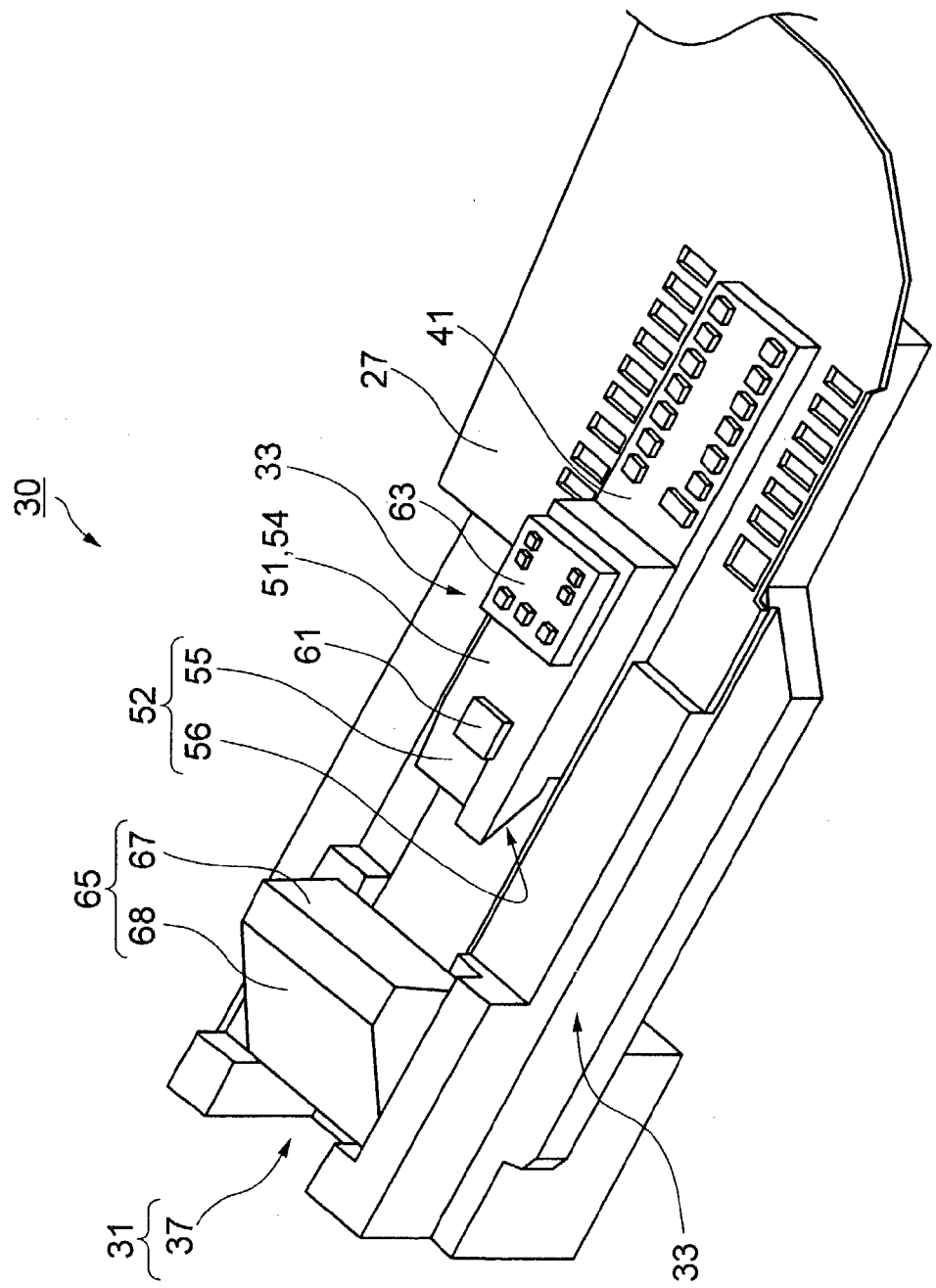
FIG. 5 is an enlarged perspective view illustrating an optical view on the rear side thereof.

Referring to FIG. 5 which is an enlarged perspective view illustrating the rear surface of the optical head 30, as viewed in a direction indicated by the arrow B in FIG. 3B, the oblique part 52 of the submount 51 is defined by two oblique surfaces one of which is an emission oblique surface 55 moderately inclined toward the surface of the lens holder 31, for blocking light emitted from the semiconductor laser 61, and the other one of which is a receiving oblique surface 56 reversely inclined as viewed from the mounting surface 54, for reflecting a reflected light beam from the optical disc 10 so as to guide the same toward the received light receiving part 47. It is noted that the receiving oblique surface 56 is formed thereon with a reflection coating so as to efficiently reflect the reflected beam from the optical disc 10. Alternatively, the inclined angel of the receiving oblique surface 56 is set so as to totally reflect the reflected light beam from the optical disc 10 in order to efficiently reflect it. It is noted that the optical reflective characteristic in this case is such as to have a high degree of reflectivity with respect to P-polarization. As will be explained later, the reflected light beam from the optical disc carries out reflection with P-polarization at the receiving oblique surface 56.

since the submount 51 is mounted thereon with the semiconductor lens 61, it is made of a material having a thermal expansion coefficient equal to that of the semiconductor laser 61 and a high thermal conductivity. For example, silicon material (SiN) or aluminum nitride ($Al_3N_2$) may be suitably used therefor. The submount 51 may be formed through machining, etching or the like. Thus, it can prevent its joint surface from being damaged due to heat generation, and can efficiently radiate heat caused by light emission of the semiconductor laser 61. Further, the lens holder 31 may be formed therein with a receiving surface (which is not shown) to which the submount 51 is joined. In this case, heat generated from the semiconductor laser 61 can be transmitted to the lens holder 31 through the intermediary of the submount 51.

The reflection mirror 65 has a triangular prism shape so as to have an incident surface 67 upon which an emission light from the semiconductor laser 61 is incident, and a reflection surface 68 for reflecting the sane onto the objective lens 39. Since both OEIC 41 and submount 51 are parallel-planar, the reflection surface 68 is formed so as to precisely have an angle of 45 deg. The reflection surface 68 is formed thereover with a reflection coating while the incident surface 67 is formed thereon with an antireflection coating in order to efficiently reflect a reflected light beam from the optical disc 10 and to prevent entrance of stray light. Both incident surface 67 and reflection surface 68 should have such an optical reflective characteristic that they have a high degree of reflectivity with respect to both S-polarization and P-polarization because the emission light beam from the semiconductor laser 61 has S-polarization but the reflected light beam from the optical disc 10 has P-polarization. In order to materialize the optical reflective characteristic with a dielectric multilayer film, it is desirable that the reflection mirror 65 has a triangular prism shape so that the reflection surface GB serves as an interface between glass and the air.

Figure 6:
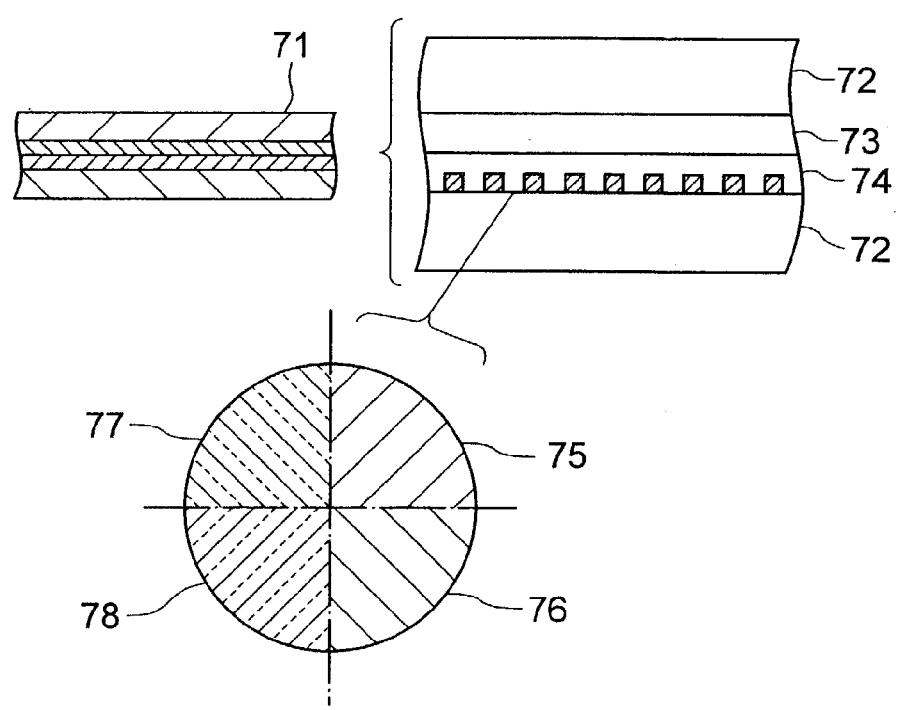
FIG. 6 is a sectional view for explaining an internal structure of a polarizing plate.

Referring to FIG. 6 which is a sectional view along the direction of propagation of the optical beam, for explaining the internal structure of a polarizing plate 71, the optical disc 10 side being the top side of the figure while the light source side being the bottom side thereof so that the outgoing light beam propagates from the bottom to top of the figure while the reflected light beam from the optical disc 10 propagates from the top to bottom of the figure, the polarizing plate 71 as the polarizing means is a composite polarization hologram which is a parallel-planar plate having a laminated multilayer structure. At first, both front and rear surfaces are defined by light conductive members 72 which are made of a material such as a highly transparent resin material or optical glass, that is, SFL-1.6 or BK-7 having a high refractive index, which can obtain a large design margin for a diffraction grating or a film, and accordingly, can offer such a feature that wavelength shift can hardly occur upon transmission. Among them, BK-7–1.5 is highly convenient since it is easily available and is excellent in workability.

An internal first layer is formed of a ¼ wave plate 73 which is located so that the direction of the optical axis when changing the phase of light has an angle of 90 deg. with respect to the direction of polarization of the outgoing light beam.

An internal second layer is a hologram film 74 which is formed of a thin film made of a highly transparent resin material, with its light conductive characteristic being selectively changed through irradiation of an ion beam or the like. This light conductive characteristic is such that the refractive index of parts to which the ion beam is irradiated is equal to that of parts to which no ion beam is irradiated with respect to the direction of polarization of the outgoing light beam but the former is different from the latter with respect to the direction of polarization of the reflected light beam from the optical disc 10. Further, by irradiating the ion beam in a lattice like-pattern, it can serve as a polarization diffraction grating. Further, this lattice pattern is set so that the reflected light beam from the optical disc 10 is led to a predetermined light receiving element in the received light receiving part 47. Thus, there can be provided a polarization hologram capable of isolating the outgoing light beam from the reflected light beam from the optical disc 10 on the optical path.

The diffraction grating which is configured as stated above is shown in an enlarged view shown in FIG. 6, and in this embodiment, the diffraction grating is quarterly divided into grating elements 75 to 78. That is, they are separated by a cross line consisting of a line parallel with the radial direction of the recording medium and a line parallel with a tangential direction of the recording medium. The quarterly divided element elements have lattice patterns(or diffracting conditions) which are different from one another. It is noted that when attention is directed to the polarizing plate 71, the diffraction grating will be exhibited as the grating elements 75 to 78 while when attention is directed to the divided lattice zones, it will be exhibited as hologram zones 131 to 134 in view of their diffractive functions. The center (that is, the crossing point of the cross line) of the quarterly divided grating elements 75 to 78 is located precisely so as to align with the optical axis when the polarizing plate 71 is mounted to the lens holder 31.

By forming the polarizing plate 71 into a composite polarization hologram, the grating elements 75 to 78 can be simply manufactured. Inter alia, it is easily fabricated and the element elements 75 to 78 can be precisely formed, in comparison with the formation of grating elements by etching the light conductive member 72. Further, since the grating elements 75 to 78 are formed of a thin film with no irregularities, they can be surely joined together.

It is noted that the ¼ wave plate 73 and the hologram film 74 are stacked in two layers in this embodiment. Thus, if the ¼ wave plate 73 is formed of a material the same as that of the hologram film 74, a hologram ¼ wave plate can be obtained by irradiating an ion beam direct onto the ¼ wave plate 73, thereby it is possible to reduce the number of required components.

Explanation will be hereinbelow made of a method of assembling the components as stated above.

Figure 7:
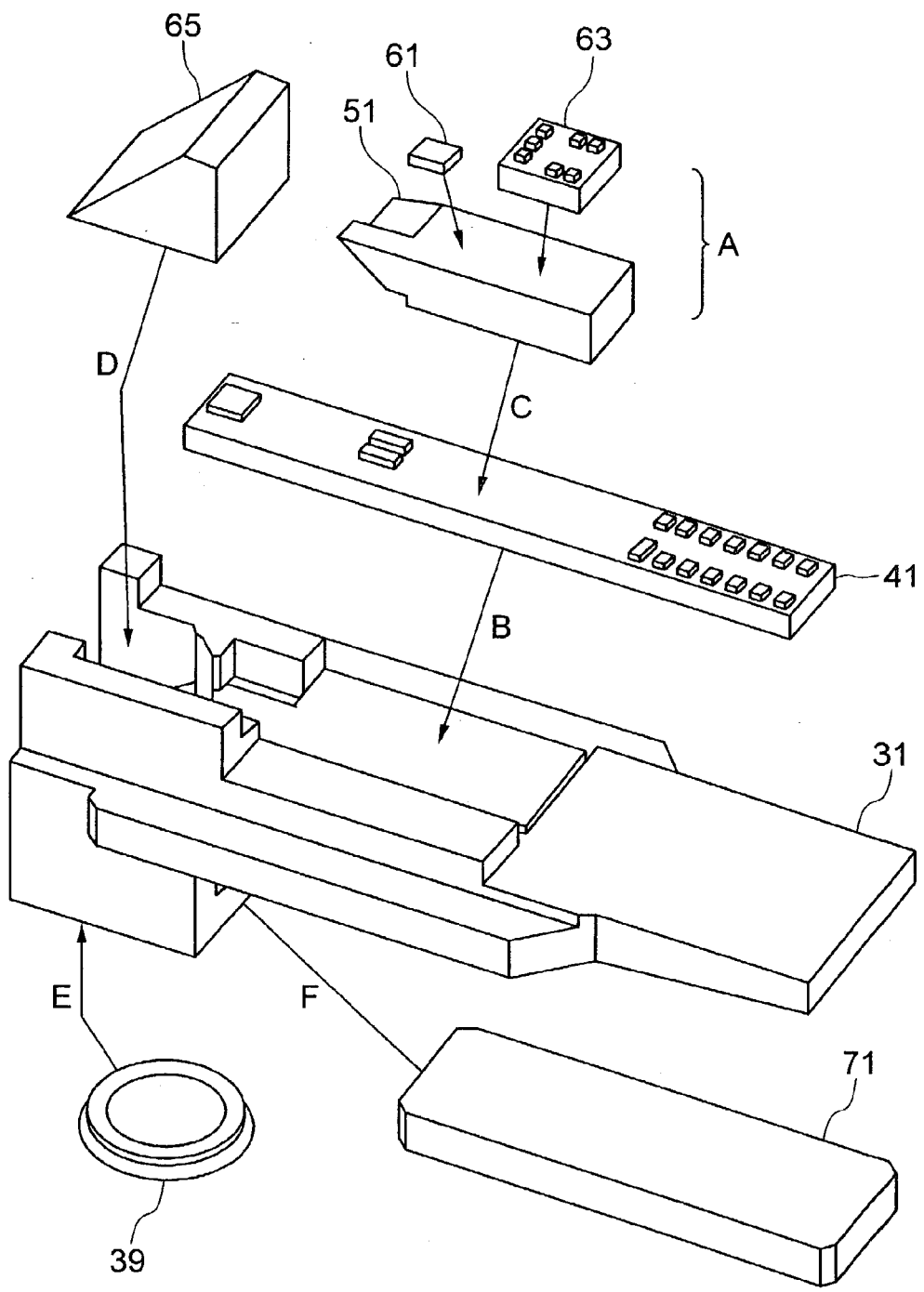
FIG. 7 is an exploded perspective view for explaining an assembly of the optical head.

Referring to FIG. 7 which is a perspective view for explaining assembling of the optical head 30, the lens holder 31 has been previously bonded thereto with the FPC 27, and further, the semiconductor laser 61 and the HFM (high frequency module) 63 have been previously bonded to the submount 51. If the submount 51 is managed as a single unit, bonding wires are connected between the semiconductor laser 51 and the submount 51 and between the HFM 63 and the submount 51, respectively. Thus, operation tests may be beforehand carried out for the submount 51 as a single unit (refer to A in FIG. 7).

Next, the OEIC 41 is bonded to the lens holder 31 (refere to B in FIG. 7), and then, the submount 51 formed as a single unit is bonded to the mount mounting part 49 of the OEIC 41 (refer to C in FIG. 7). At this time, the terminal part 46 of the OEIC 41 is connected to the HFM 63 with a bonding wire. Further, at this time, the above-mentioned wire bonding may be made to the submount 51.

Further, the mirror fixing part 37 of the lens holder 31 is bonded thereto with a reflection mirror 65 and the holder part 34 of the lens holder 31 is bonded thereto with the objective lens 39 (refer to E in FIG. 7). Finally, a dummy reflection mirror is located, instead of the optical disc 10, and the semiconductor laser 6 is energized for testing. The polarizing plate 71 is adjusted in position to and then mounted onto the polarizing plate mounting part 36 of the lens holder 31 while a condition of receiving of the reflected light beam is monitored (refer to F in FIG. 7).

As stated above, all optical components are fixed to the lens holder 31, direct thereto or in stacks, and accordingly, they are simply assembled so as to facilitate the manufacture of the pick-up apparatus, thereby it is possible to aim at reducing manhours for the manufacture. Further, rigging and adjustment can be attained only through the positional adjustment of the polarizing plate 71 at a one position, and accordingly, the rigging and adjustment can be facilitated. Further, since only nine components as mentioned above are necessary, the number of components and the cost thereof can be greatly reduced. In addition, since the above-mentioned manhour reduction can be made, it is possible to provide the optical head 30 at a low cost.

Figure 8:
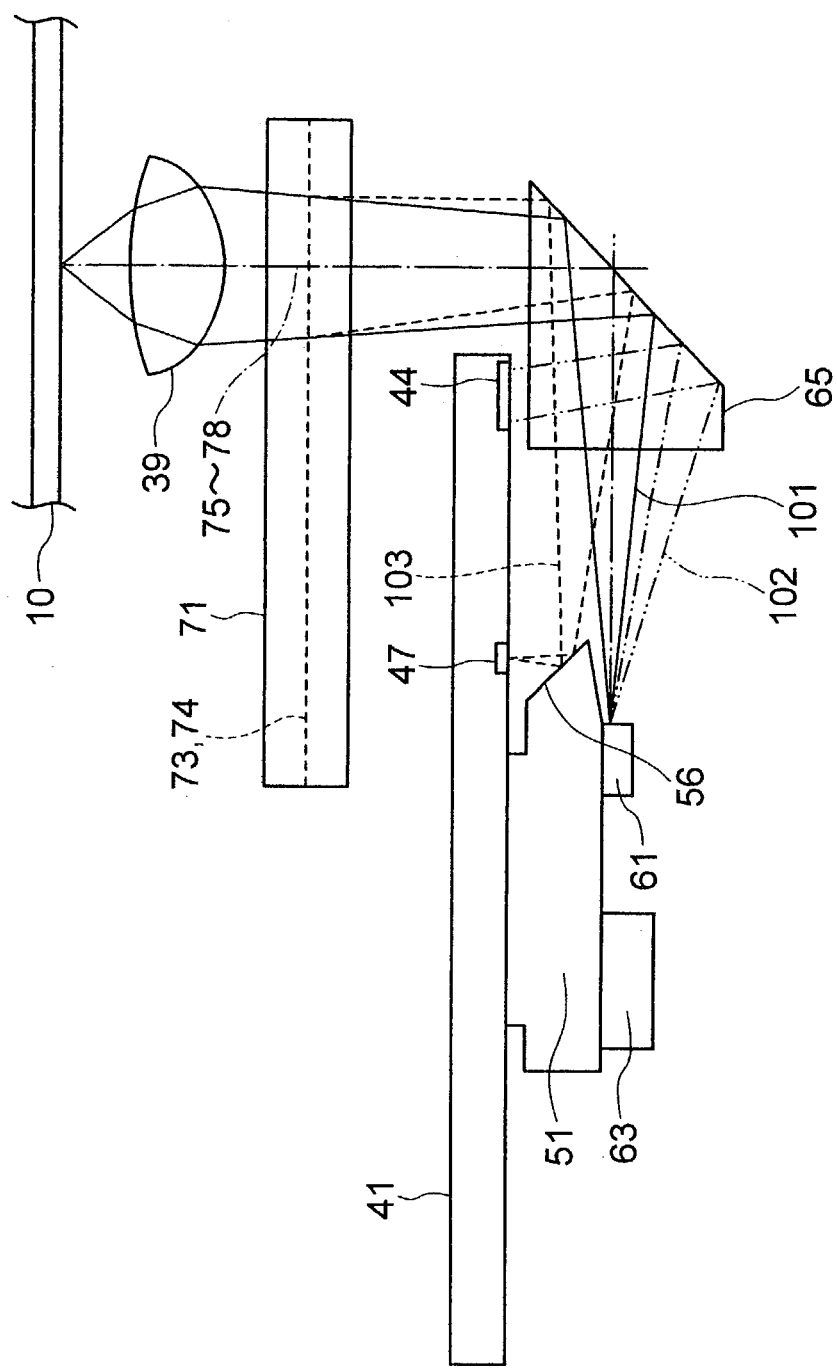
FIG. 8 is a view for explaining an optical configuration of the optical head according to the present invention.

Explanation will be made of an optical configuration of the optical head 30 in the present invention, which is constructed as stated above. Referring to FIG. 8 which is a view for explaining the optical head 30 in the present invention, and in which the optical components of the optical head 30 shown in FIG. 2 are sectioned along the optical axis (the optical axis T which will be explained) of the light beam emitted from the semiconductor laser 61, a light beam emitted from the semiconductor laser 61 and directed to the optical disc 10 is indicated by a solid line while a light beam (which will be hereinbelow referred to as a return light beam 103) reflected from the optical disc 10 and directed to the received light receiving part 47 is indicated by a dotted line. It is noted that among outgoing light beams, a light beam (which will be abbreviated as a monitor beam 102) in a zone where the light beam is detected by the monitor light receiving beam 44 as a monitor light receiving means is indicated by a two-dot chain line. It is noted that an optical axis T is the optical axis of the light beam emitted from the semiconductor laser 61, and an optical axis Z is the optical axis of a light beam extending between the objective lens 39 and the reflection mirror 39, as shown in the figure.

It is estimated that a light beam with linear polarization that is, the outgoing light beam 101 is emitted from the semiconductor laser 61, the light beam is propagated along the optical axis T while it is diffused. When it comes to the reflection mirror 65, it is reflected at the reflection surface 58 and is then propagated along the axis Z.

After the outgoing light beam 101 is incident upon the polarizing plate 71, it transmits through the light conductive member 72 and is then incident upon the hologram film 74 having the diffraction grating which does not affect the direction of polarization of the outgoing light beam 101, and accordingly, the outgoing light beam transmits through the hologram film 74, and is then incident upon the next ¼ wave plate 73.

Upon transmission through the ¼ wave plate 73, the outgoing light beam 101 with linear polarization is turned into an outgoing light beam with circular polarization, having a phase which is rotated by 90 deg. The outgoing light beam 101 with the circular polarization transmits through the light conductive member 72, and converged by the objective lens 39 so as to be focused onto a recording layer of the optical disc 10.

A light beam reflected by the recording layer of the optical disc 10 is turned into a return light beam 103 which travels reversely on the optical path along the optical axis Z, and the circular polarization of the outgoing light beam 101 becomes circular polarization which is reversely rotated when it is reflected at the recording layer of the optical disc 10. After the return light beam 103 is incident upon the polarizing plate 71, it transmits through the light conductive member 72 and is then incident upon the ¼ wave plate 73. Upon transmission through the ¼ wave plate, the phase of the return light beam 103 with the circular polarization is rotated by 90 deg., and accordingly, it is turned into a light beam with linear polarization. That is, the return light 103 with linear polarization has a phase difference of 90 deg. with respect that of the outgoing light beam 103 with linear polarization.

Next, it is incident upon the hologram film 74. At this time, since the diffraction grating of the hologram film 74 affects the direction of polarization of the return light beam 103, and the return light beam 103 is subjected to action by the grating elements 75 to 78 so as to obtain a transmitted diffraction light beam which is then incident upon the reflection mirror 65. The transmitted diffraction light beam of the return light beam 103 is reflected at the reflection surface 68, being slightly displaced from the optical axis Z in more strictly speaking.

Thus, the return light beam 103 is separated from the optical axis T, and is then incident upon the receiving oblique surface 56. The return light beam 103 is again reflected at the receiving oblique surface 56, and is then incident upon the received light receiving part 47. Since the optical path of the outgoing light beam 101 from the semiconductor laser 61 to the optical disc 10 is separated from the optical path of the return light beam 103 from the optical disc 10 to the receved light receiving part 47 by means of the hologram film 74 and the receiving oblique surface 56 and the submount 51, an extremely simple optical system can be configured.

For example, a polarization separation type reflection mirror may be used, instead of the receiving oblique surface 56 of the submount 51. However, since the return light beam has P-polarization, it is in general difficult to obtain a high reflectivity in this case. Accordingly, with the use of a configuration in which a ½ wave plate is interposed between two reflection coatings, the outgoing light beam may have P-polarization while the return light beam may have S-polarization. However, in this case, a complicated optical system should be used, and further, it would be necessary to ensure characteristics including a high reflectivity. A light beam of the outgoing light beam 101 which has been diffused and which is incident upon the reflection mirror 65 along the optical axis T at an incident angle which is greatly different from those in the center part around the optical axis T since the diffused light beam is located in the peripheral part. Thus, although it travels along the optical axis Z after it is reflected by the reflection surface 68, it is gradually separated from the optical axis Z and is incident upon the monitor light receiving part 44. That is, the light beam diffused in the peripheral zone and received by the monitor light receiving part 44 will be referred to as a monitor light beam 102. Since a front monitor system for detecting a part of the light beam emitted from the semiconductor laser 61 as a monitor for controlling a laser power is used, this is precisely proportional to the optical power of the main beam in the center part around the axis, thereby it is possible to precisely control the laser power.

Next, detailed explanation will be made of a control method for focusing and tracking, and the control characteristics thereof. It has been explained that the hologram film 74 consists of the divided four holograms. Further, as shown in FIG. 4, the receved light receiving part 47 consists of light receiving elements which are divided into eight zones (that is, they are eight light receiving elements). Accordingly, a spot-size process can be used for the focusing control, and a single beam P-P (push-pull) process can be used for the tracking control. These control methods will be explained hereinbelow.

Figure 9:
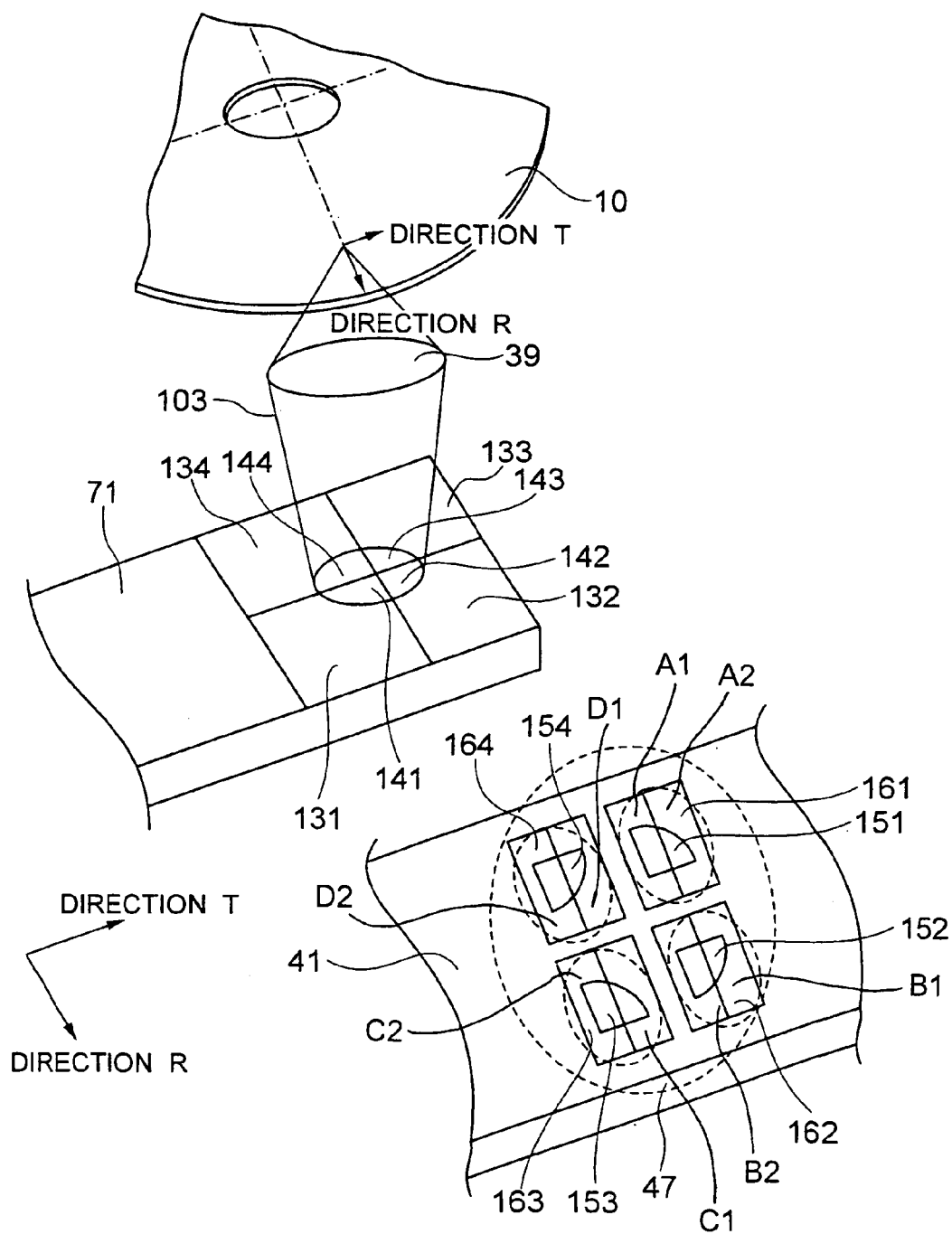
FIG. 9 is a view for explaining a relationship among the optical disc, a hologram zone and a received light pattern.

Referring to FIG. 9 which is a view for explaining a relationship among the optical disc, the hologram zones (lattice zones) and the receiving pattern (light receiving zones), divided patterns of the hologram zones 131 to 134 and the light receiving patterns 161 to 164 of the received light detecting part 47 in the OEIC 41 are shown on the basis of the tracking direction (tangential direction) T and the radial direction R of the optical disc 10. It is noted that the light receiving patterns of the light receiving zones 161 to 164 (refer to the partially enlarged view in FIG. 4 and FIG. 10) having a function of composite detection elements and corresponding to the divided patterns of the hologram zones are exhibited. The OEIC 41 shown in FIG. 9 is given, as the polarizing plate 71 is viewed in the direction of propagation of the return light beam 103, and in this case, the return light beam 103 comes to the received light detecting part 47 by way of two mirrors, that is, the reflection mirror 65 and the receiving oblique surface 56 formed in the submount 51. In view of this situation, the OEIC 41 and the received light detecting part 47 will be shown.

The light beam which is focused by the objective lens 39 is reflected at the recording layer of the optical disc 10, and is incident upon the polarizing plate 71 through the intermediary of the objective lens 39. The hologram 74 which is inserted in the polarizing plate 71 (refer to FIG. 6) is formed therein with the grating elements 75 to 78 divided into four zones as shown in FIG. 9. These divided grating elements 75 to 78 are called as the hologram zones 131 to 134. As to the manner of the division, they are divided into a cross-line like pattern by orthogonal lines which are parallel with the tangential direction T and the radial direction R, respectively. The lines parallel to the tangential direction T and the radial direction R will be hereinbelow referred to simply as division lines. As shown in the figure, the zones which are divided by the division line in parallel with the radial direction R are the hologram zones 131, 134 and 132, 133. Meanwhile, zones which are divided by the division line in parallel with the tangential direction T are the hologram zones 131, 132 and 133, 134.

The return light beam 103 which has been incident upon the hologram zones 131 to 134 is diffracted, and is then led to the received light detecting part 47 of the OEIC 41 by way of the reflection mirror 65 and the receiving oblique surface 56. This received light detecting part 47 is mainly divided into four light receiving patterns as shown in FIG. 9 (refer to FIG. 4). As to the configuration of the division, they are divided into by lines which are in parallel with the direction T and the direction R, respectively. The light receiving patterns divided by the division lines in parallel with the direction R are those 161, 162 and 163, 164. Meanwhile, the light receiving patterns divided by the division line in parallel with the direction T are those 161, 164 and 162, 163. As will be explained later, it is designed in such a way that the return light beam 103 having passed through the hologram zones 131, 132 and 133, 134 is split into four sub-means which are led to the light receiving patterns 161, 162, 163, 164, respectively.

Referring to FIG. 10 which is a view for explaining a relationship between the light receiving patterns and the return incident light beam, the return light beam 103 having transmitted through the polarizing late 71 is incident upon the received light detecting part 47. The right side part of the figure shows such a situation that the received light detecting part 47 is viewed in the direction of the return light beam 103 which comes thereto by way of the two mirrors, that is, the reflection mirror 65 and the receiving oblique surface 56. The left side part of this figure is a sectional view illustrating the received light detecting part 47 as viewed in the direction T, as stated above. The direction R and the direction T of the optical disc 10 are shown in this figure.

As already stated, the received light detecting part 47 of the OEIC 41 is mainly divided into four light receiving zones, that is, light receiving patterns 161 to 164. Further, these light receiving patterns 161 to 164 are bisected in the direction T by the division line in parallel with the direction R, and accordingly, eight zones in total are obtained. Specifically, the light receiving pattern 161 is divided by the division line in parallel with the direction R into a light receiving element A1 of the light receiving pattern 161, a light receiving element A2 of the light receiving pattern 161 (for the sake of simplicity in explanation, they will be referred to as the light receiving element A1 and the light receiving element A2, respectively). Similarly, the light receiving pattern 162 is divided into light receiving elements B1, B2, the light receiving pattern 163 into light receiving elements C1, C2, and the light receiving patterns 164 into light receiving elements D1, D2.

It is designed so that a light beam transmitting through the hologram zone 131 comes to the light receiving pattern 161, through the hologram zone 132 to the light receiving pattern 162, through the hologram zone 133 to the light receiving pattern 163, and through the hologram zone 134 to the light receiving pattern 164. Further, the grating elements 75 to 78 and the light receiving patterns 161 to 164 are designed and the reflection mirror 65 and the receiving oblique surface 56 are arranged so that the return light beam 103 is diffracted by the hologram zones 131 to 134 so as to obtain subbeams which are led to substantially center points of the light receiving patterns 161 to 164, respectively.

The return light beam 103 coming to the light receiving patterns 162, 163 (that is, incident return light subbeams 152, 153), as shown by a sectional view in FIG. 10, is focused to a focal point on the side of the front surfaces of the light receiving patterns, remote from the objective lens 39. Meanwhile, the return light beam 130 coming to the light receiving patterns 161, 164 (that is, incident return light subbeams 151, 154) is focused to a focal point on the side of the front surfaces of the light receiving patterns, near to the objective lens 39.

since the grating elements 75 to 78 are designed as stated above, when the incident return light subbeams 151 to 154 are incident upon the light receiving patterns 161 to 164, they have shapes which are not spot-like shapes but those similar to the shape of the return light beam 103 transmitting through the hologram zones 131 to 134. It is noted that the incident return light subbeams 151 on the light receiving pattern 161 and the incident return light subbeam 154 on the light receiving pattern 164 have shapes which are reverse to each other, being point-symmetry with the point of the incident light beams 151, 154 corresponding to the cross point of the cross line for dividing the shape of the return light beam 103 transmitting through the hologram zones 131 to 134 into four sections since the incident return light beams 151, 154 are focused to a point on the side of the front surfaces of the light receiving patterns, near to the objective lens 39.

In summary of the explanation as mentioned, as to the hologram zones 131, 134 and 132, 133, the return light beam 103 is led from the hologram zones 131, 134 to the light receiving parts 161, 164 which are divided by the division line in parallel with the direction T. Similarly, they are focused to focal points on the side of the front surfaces of the light receiving patterns, near to the objective lens 39. Meanwhile, the return light beam 109 is led from the hologram zones 132, 133 is led to the light receiving patterns 162, 163 which are divided similarly by the division line in parallel with the direction T, and are focused to a focal point on the side of the surfaces of the light receiving patterns, remote from the objective lens 39.

Further, as to the hologram zones 131, 132 and 133, 134 which are divided by the division line in parallel with the direction T, the hologram zones 131, 132 are allocated to the light receiving patterns 162, 162 which are divided by the division line in parallel with the direction R. Similarly, the hologram zones 133, 134 are allocated to the light receiving patterns 163, 164 which are divided by the division line in parallel with the direction R.

That is, as to two zones, on one hand, of the hologram which is divided by the division line in parallel with the direction R and two zones, on the other hand, of the hologram, the incident return light subbeams from the two zones on one hand, are focused to focal points on the side of the front surface of the light receiving patterns, remote from the objective lens 39, and those from the two zones on the other hand, are focused to the focal points on the side of the front surface of the light receiving patterns, near to the objective lens 39 in view of the optical path. The hologram is designed in such a way that these incident return subbeams are led to two, on one hand, and two, on the other hand, of the light receiving zones which are divided by the division line in parallel with the direction T while the incident return light subbeams from the two, on one hand, and two, on the other hand, of the light receiving zones which are divided by the division line in parallel with the direction T are led to two, on one hand, and two, on the other hand, of the light receiving zones which are divided by the division line in parallel with the direction R, respectively.

Accordingly, with the representation directed to the configuration of the light receiving patterns 161 to 164, the group of the hologram zones 131, 134 and the group of the hologram zones 132, 133, which are grouped in the direction T by the division line in parallel with the direction R are allocated respectively to the group of the light receiving patterns 161, 164 and the group of the light receiving patterns 162, 163 in the light receiving part 47, which are grouped in the direction R by the division line in parallel with the direction T.

In other words, the return light beam 103 having transmitted through the grating elements 75 to 78 (hologram zones 131 to 134) located in the polarizing plate 71, is turned into the incident return light subbeams 151 to 154 which are incident upon the light receiving patterns 161 to 164 (clockwise direction in FIG. 9) which are in a configuration reversely rotated from the configuration of the hologram zones 131 to 134 (counterclockwise in FIG. 9).

Further, these incident light subbeams 151, 154, 152, 153 are focused to focal points in the group of the light receiving patterns 161, 164, which are near to the objective lens 39, and to the focal points in the group of the light receiving patterns 162, 163, which are remote from the objective lens 39.

Thus, if the group of the light receiving patterns 161, 164 and the group of the light receiving patterns 162, 163 which are grouped in the direction R, are grouped in the direction T of the detecting part 47, two combinations respectively having the focal points which are near to the objective lens 39 and the focal points which are remote from the objective lens 39 (that is, the combination of the light receiving patterns 161, 162 and the combination of the light receiving patterns 163, 164) can be obtained.

With the use of the above-mentioned configuration, the focus control and the tracking control can be materialized. In addition, a self-correcting function for affection by tilting of the optical disc 10 or for affection by an environmental temperature can be incorporated into the focus control and the tracking control. As a result, there can be provided an excellent optical system in which all optical systems can be completely adjusted only by adjusting the position of the polarizing plate 71.

Figure 11A:
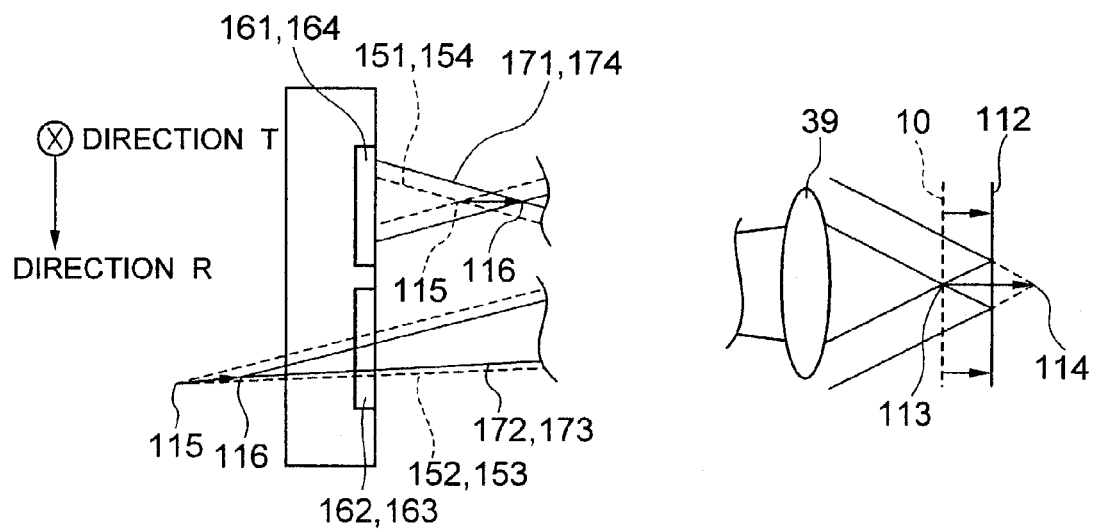
FIGS. 11A and 11B are views for explaining a focus control method.
Figure 11B:
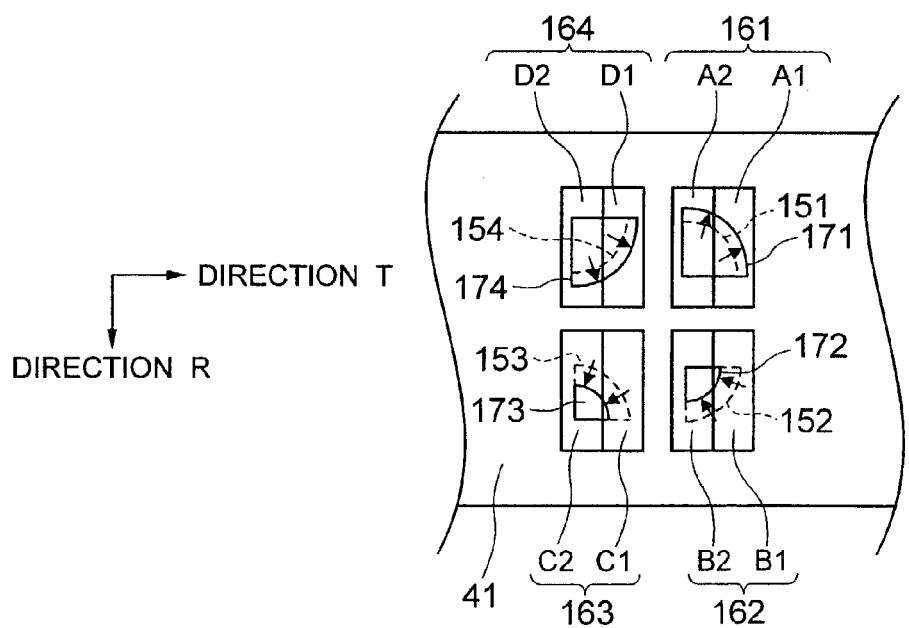

At first the focus control method will be explained. Referring to FIGS. 11A and 11B for explaining the focus control method, explanation will be made of variation in the focal point of the optical disc 10 and variation of the return light beam when the optical disc 10 causes defocusing in a direction away from the objective lens 39. FIG. 11A includes a view which shows the variation of the focal point around the optical disc and a sectional view thereof, and FIG. 11B is a view which shows the variation of the return light subbeams.

First, estimation is made such that the optical disc 10 is displaced away from the objective lens 39, causing defocusing, so as to come to a defocus position 112, a mirror image 114 is produced at a focus position on the disc, due to the defocus position 112 after defocusing. Since the return light beam 103 is reflected back from the optical disc 10 to the objective lens 39 with the mirror image 114 as the focus point, a focus point on a light receiving pattern also varies. That is, since a focus point 115 of the return light beam varies on the received light detecting part as the optical disc 10 is displaced away from the objective lens 39, the focus point 115 on the received light detecting part 47 is displaced approaching the objective lens 39.

Referring to FIG. 11A shows such a manner that the focus point 115 on the received light detecting part 47 displaced to a defocus point 116, approaching the objective lens 39 as the optical disc 10 comes away from the objective lens 39. In this case, as shown in FIG. 11B, the incident return light subbeams 152, 153 having focus points which are located on the side of the front surfaces of the light receiving patterns 161 to 164, remote from the objective lens 39 come to the defocus point 116, and accordingly, they are turned into incident return light subbeams 172, 173 with small defocusing. Meanwhile, since the incident return light subbeams 151, 154 have focus points which are located on the side of the front surfaces of the light receiving patterns 161 to 164, near to the objective lens 39, they are turned into incident return light subbeams 171, 174 with large defocusing. Although the defocus incident light subbeams 171 to 174 are changed with their quarter circle shape being maintained, the straight-line segments of the quarter circular shape corresponding to the division lines of the grating elements 75 to 78 are not displaced, but the boundary lines of the circular arc parts (the transmission light around the return light beam 103 having transmitted through the objective lens 39) are displaced. Thus, the size of the quarter circular shape is changed.

Due to the variation of the defocus incident return light subbeams 171 to 174 as mentioned above, incident light beam quantities (received light quantities at light receiving patterns 116 to 164) change. The incident return light beams 152, 153 having focus points located on the side of the front surfaces of the light receiving patterns 161 to 164, remote from the objective lens 39 are turned into the defocus incident return subbeams 172, 173 so as to decrease their light receiving areas as the focus points are displaced to the defocus point 116. At this stage, by comparing variations in received light quantity with those before the defocusing, it decreased at the light receiving elements B1 and the light receiving element C1, but it increases at the light receiving element B2 and the light receiving element C2 (refer to FIG. 11B).

Meanwhile, the incident return light subbeams 151, 154 having focus points which are located on the side of the front surfaces of the light receiving patterns 161 to 164, near to the objective lens 39, are turned into the defocus incident return light subbeams 171, 174 so as to increase their light receiving areas as the focus points are displaced to the defocus point 116. At this stage, by comparing variations in received light quantity at the light receiving zones with those before the defocusing, it increases at the light receiving element A1 and the light receiving element D1 but it decreases at the light receiving element A2 and the light receiving element D2.

Figure 12A:
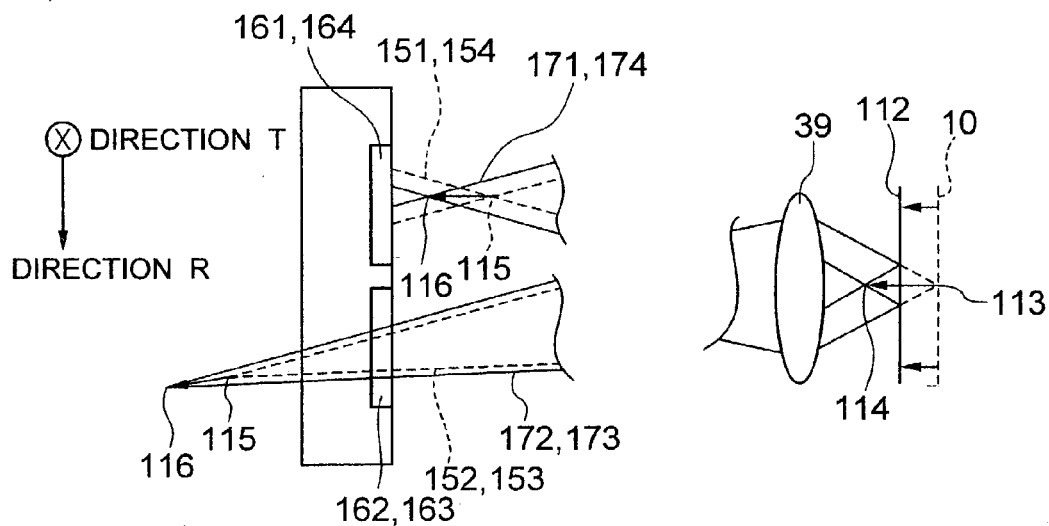
FIGS. 12A and 12B are views for explaining a focus control method.
Figure 12B:
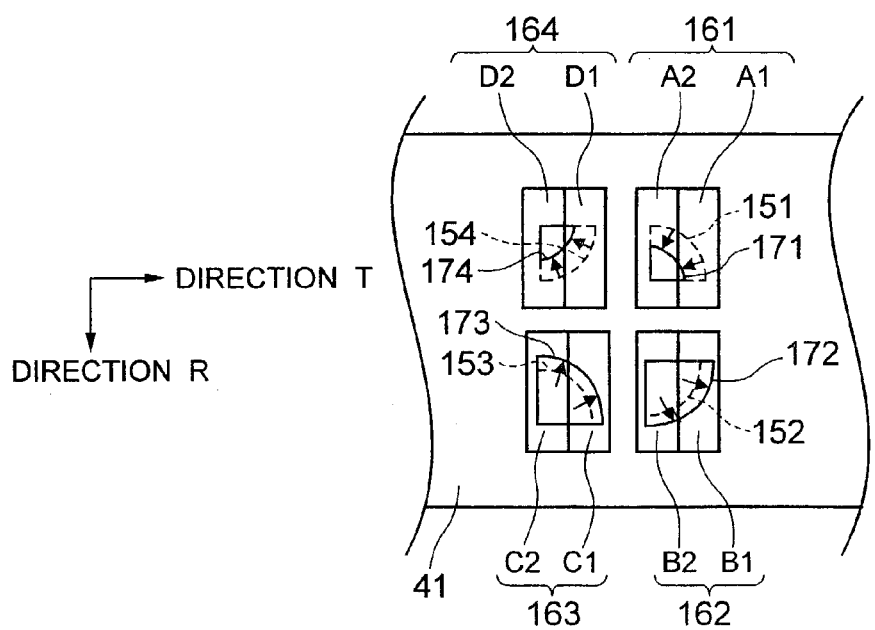

Referring to FIGS. 12A and 12B which are views for explaining the focus control method, explanation will be made of variation of the focus point on the optical disc 10 and variation of the incident return light beam in the case of defocusing caused by displacement of the optical disc 10 approaching the objective lens 39. FIG. 12A is a view which shows the variation of the focus point around the optical disc and a sectional view thereof, and FIG. 12B is a view which shows variation of the incident return light subbeams.

First, estimation is made such that the optical disc 10 is displaced approaching the objective lens 39 to the defocus position 112. A mirror image 114 caused by the defocus position 112 after defocusing is produced at the focus point 113 on the disc. Since the return light beam 103 is reflected back from the optical disc 10 to the objective lens 39 with the mirror image 114 as the focus point, the focus points on the light receiving patterns also varies. That is, since the focus point of the return light beam on the received light detecting part approaches the objective lens 39 as the optical disc 10 is displaced approaching the objective lens 39, the focus point 115 on the received light detecting part is displaced approaching the objective lens 39.

That is, since the focus point 115 of the return light beam 103 on the received light detecting part approaches the objective lens 39 as the optical disc 10 approaches the objective lens 39, the focus point on the received light detecting part is displaced approaching the objective lens 39. FIG. 12A shows such a manner that the focus point on the received light detecting part is displaced to the defocus focus point 116, approaching the objective lens 39 as the optical disc 10 approaches the objective lens 39.

In this case, referring to FIG. 12B, since the incident return light subbeams 152, 153 having focus points on the side of the front surfaces of the light receiving patterns 161 to 164, remote from the objective lens 39, are displaced to the defocus focus point 116, they are turned into incident return light subbeams 172, 173 having large defocus. Meanwhile, since the incident return light beams 151, 154 having focus points which are located on the side of the front surface of the light receiving patterns 161 to 164, near to the objective lens 39, (that is, adjacent to the front surfaces of the light receiving patterns 161 to 164) are displaced to the defocus focus point 116, they are turned into defocus incident return light beams 171, 174 having small defocus. Similar to the case shown in FIGS. 11A and 11B, although the defocus incident light subbeams 171, 174 vary with maintaining their quarter circular shapes, the straight line segments of the quarter circular shape corresponding the division lines of the grating lements 75 to 78 are not displaced, but the border lines of the arc segments (transmission light beams around a position where return light beam 130 has transmitted through the object lens 39) are displaced so that the size of the quarter circular shape varies.

Due to variation into the defocus incident return light subbeams 171 to 174, the incident light quantities (received light quantities at the light receiving patterns 161 to 164) vary. The incident return light subbeams 152, 153 having focus points which are located on the side of the front surfaces of the light receiving patterns 161 to 164, remote from the objective lens 39, are turned into the defocus incident light subbeams 172, 173 so as to increase their light receiving areas as the focus point is displaced to the defocus focus point 116. At this stage, by comparing variations in received light quantity in the light receiving zones with those before defocusing, it increases at the light receiving element B1 and the light receiving element C1, but it decreases at the light receiving element B2 and the light receiving element C2 (refer to FIG. 12B).

Meanwhile, the incident return light subbeams 151, 154 having focus points which are located on the side of the front surfaces of the light receiving patterns 161 to 164, near to the objective lens 39, are turned into the defocus return light subbeams 171, 174 so as to decrease their light receiving areas as the focus point is displaced to the defocus focus point 116. At this stage, by comparing variations in received light quantity at the light receiving zones with those before the defocusing, it decrease at the light receiving element A1 and the light receiving element D1 but it increases at the light receiving element A2 and the light receiving element D2 (refer to FIG. 12B).

The optical beams incident upon the light receiving elements A1 to D2 of the light receiving patterns 161 to 164 are delivered in the form of voltage signals in proportion to the receive light quantities which are converted into optical signals by means of the OEIC 41. If an output voltage signal V is delivered from the OEIC 41, a voltage signal VA1 is delivered from the light receiving elements A1 while a voltage signal VA2 is delivered from the light receiving element A2. Similarly, there are delivered a signal VB1 from the light receiving element B1, VB2 from the light receiving element B2, VC1 from the light receiving element C1, VC2 from the light receiving element C2, VD1 from the light receiving element D1 and VD2 from the light receiving element D2.

Thus, defining formulae from the output voltage signals, the following equations are obtained:

$$A = VA1 + VB2 \quad \text{(Eq. 1)}$$

$$B = VA2 + VB1 \quad \text{(Eq. 2)}$$

$$C = VC2 + VD1 \quad \text{(Eq. 3)}$$

$$D = VC1 + VD2 \quad \text{(Eq. 4)}$$

Further, in the above-mentioned equations, the variation in the light receiving zones caused by affection by the above-mentioned defocusing are included. In the case of the optical disc 10 going away from the objective lens 39, the received light quantity increases at the light receiving element A1, the light receiving element B2, the light receiving element C2 and the light receiving element D1. Meanwhile, the light quantity decreases at the light element A2, the light receiving element B1, the light receiving element C1 and the light receiving element D2. Thus, the output voltage signals A (Eq. 1), C (Eq. 3) are increased, but the output voltage signals B (Eq. 2), D (Eq. 4) are decreased.

On the contrary, in the case of the optical disc 10 approaching the objective lens, the received light quantity increases at the light receiving element A2, the light receiving element B1, the light receiving element C1 and the light receiving element D2. Meanwhile, the received light quantity decreases at the light receiving element A1, the light receiving element B2, the light receiving element C2 and the light receiving element D1. Thus, the output voltage signals B (Eq. 2), D (Eq. 4) are increased but the output voltage signals A (Eq. 1), C (Eq. 3) are decreased.

Thus, the focus error control signal FE can be exhibited by the following formula:

$$FE = (A+C) - (B+D) \quad \text{(Eq. 5)}$$

Thus, FE (Eq. 5) becomes zero when the optical disc 10 comes to the focal point of the objective lens 39. It becomes positive when the optical disc 10 goes away from the objective lens 39, but becomes negative when the optical disc 10 approaches the objective lens 39. Thus, FE can be used as a focus control signal. Thus, focus servo control can be made so as to allow FE to become zero.

Figure 13:
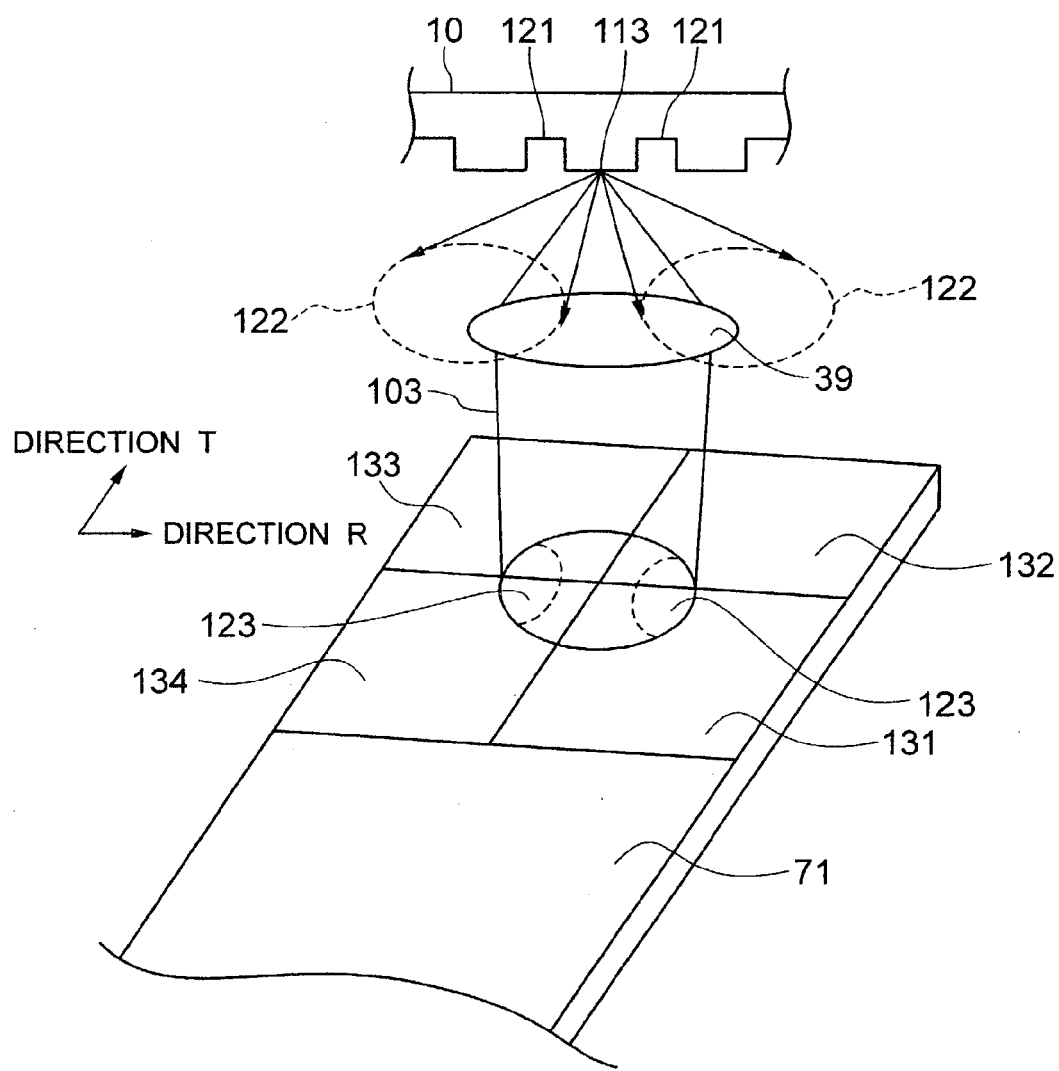
FIG. 13 is a view for explaining light diffracted by a guide groove in an optical disc.

Next, explanation will be hereinbelow made of the tracking control method. Referring to FIG. 13 which is a view for explaining a diffracted beam caused by a guide groove formed in the optical disc 10, the return light beam 103 is affected by the guide grooves 121 formed in the optical disc 10 when the disc focus point 113 is aligned with the surface of the optical disc 10, which is shown in the enlarged sectional view. Data should be recorded on or reproduced from the center of a protrusion interposed the guide grooves 121 for tracking control as the optical disc 10 is viewed from the objective lens 39. Thus, the disc focus point 113 should be precisely aligned with a part between the guide grooves 121, that is, the center of the protrusion.

The disc focus point 113 set on the surface of the optical disc 10 is reflected and as well is affected by diffraction by the guide grooves 121 so as to be turned into the return light beam 103 including a 0-th-order light beam reflected by the protrusion and ±1-th order light beams 122 diffracted by the guide grooves 121, and the return light beam 103 is returned to the objective lens 39. The light beams which arm not incident upon the objective lens 39 are rejected, and accordingly, do not subsequently contribute to the return light beam 103. Thus, the guide groove diffracted light beams 122 are turned into diffracted return light beams 123 having optical shapes which are accepted by the objective lens 39 come onto the polarizing plate 71 the grating elements 75 to 78. The diffracted return beams 123 which have come onto the polarizing plate 71 after transmitting through the objective lens 39 and which are caused by the guide grooves 121 have an equal light quantity since ±1-th order light quantity ratios are equal to each other.

Figure 14A:
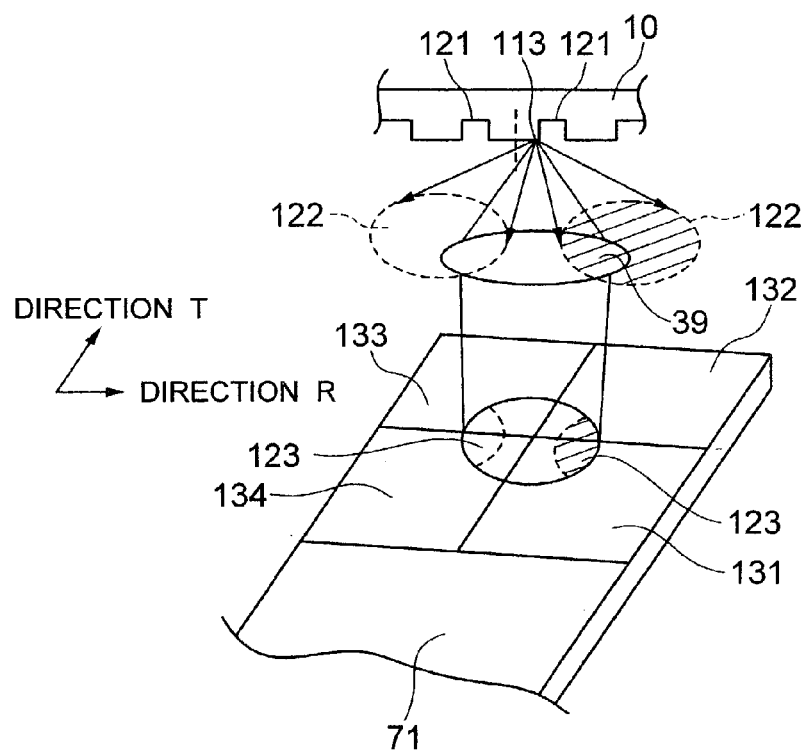
FIGS. 14A and 14B are views for explaining a principle of tracking control.
Figure 14B:
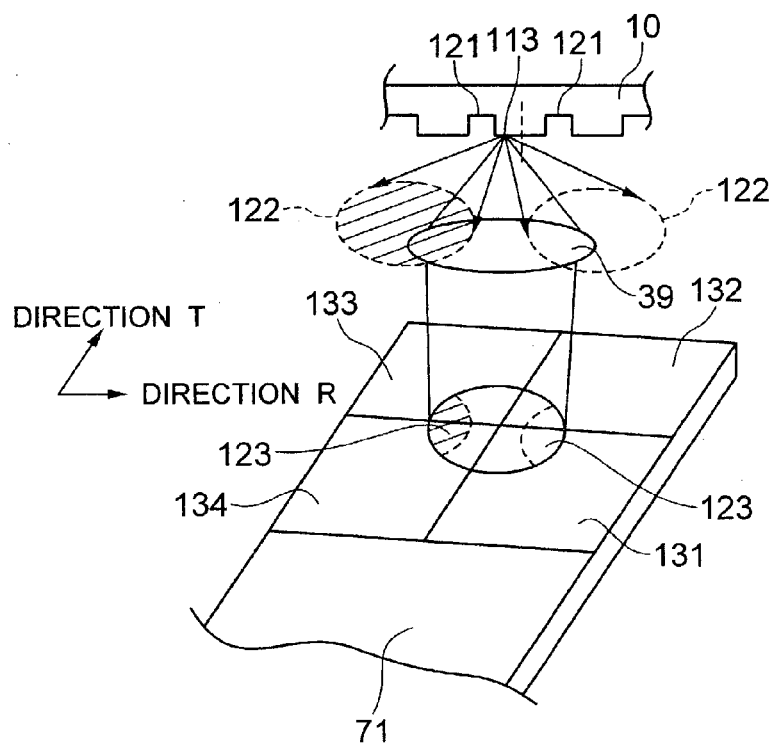

Next, explanation will be made of a tracking control method using a push-pull process with reference to FIGS. 14A to 143 which are views for explaining a principle of the tracking control, and in which FIG. 14A shows the disc focus point 113 which is displaced rightward from the center of the protrusion, and FIG. 14B shows the disc focus point 113 which is displaced rightward from the center of the protrusion. Referring first to FIG. 14A, when the disc focus point 113 is displaced rightward from the part between the guide grooves 121 of the optical disc 10, that is, the center of the protrusion, the light quantity ratios of the diffracted light beams caused by the ±1-th order light beams by the guide grooves 121 vary so that, as shown in the figure, the diffracted return light beam 123 on the polarizing plate 71 on the left side becomes bright but the diffracted return light beam 123 (indicated by the shaded part) on the right side becomes dark.

On the contrary, referring to FIG. 14B, when the disc focus 113 is displaced leftward from the part between the guide grooves 121 of the optical disc 10, that is, the center of the protrusion, the light quantity ratios of the diffracted light beams caused by the ±1-th order light beams by the guide grooves 121 vary so that, as shown in the figure, the diffracted return light beam 123 on the polarizing plate 71 on the right side becomes bright but the diffracted return light beam 123 on the left side becomes dark.

Thus, by computing differentials between electrical signals respectively obtained by the two received light patterns (161, 162) on one hand and the two received light patterns (163, 164) on the other hand, that are guided respectively by the two zones (the hologram zones 131, 132) on one hand and the two zones (the hologram zones 133, 134) on the other hand which are divided by the division line in parallel with the direction T, they are used as tracking control signals. The principle of the tracking control method using a push-pull process has been explained hereinabove. It is noted that although push-pull signals are obtained with the use of the hologram zones 131 to 134 which are divided by the division line in parallel with the direction T in this embodiment, the tracking control signals may be obtained from electrical signals from photodetectors which are divided by the division line in parallel with the direction T and which are directly arranged, instead of these hologram zones 131 to 134.

Figure 15:
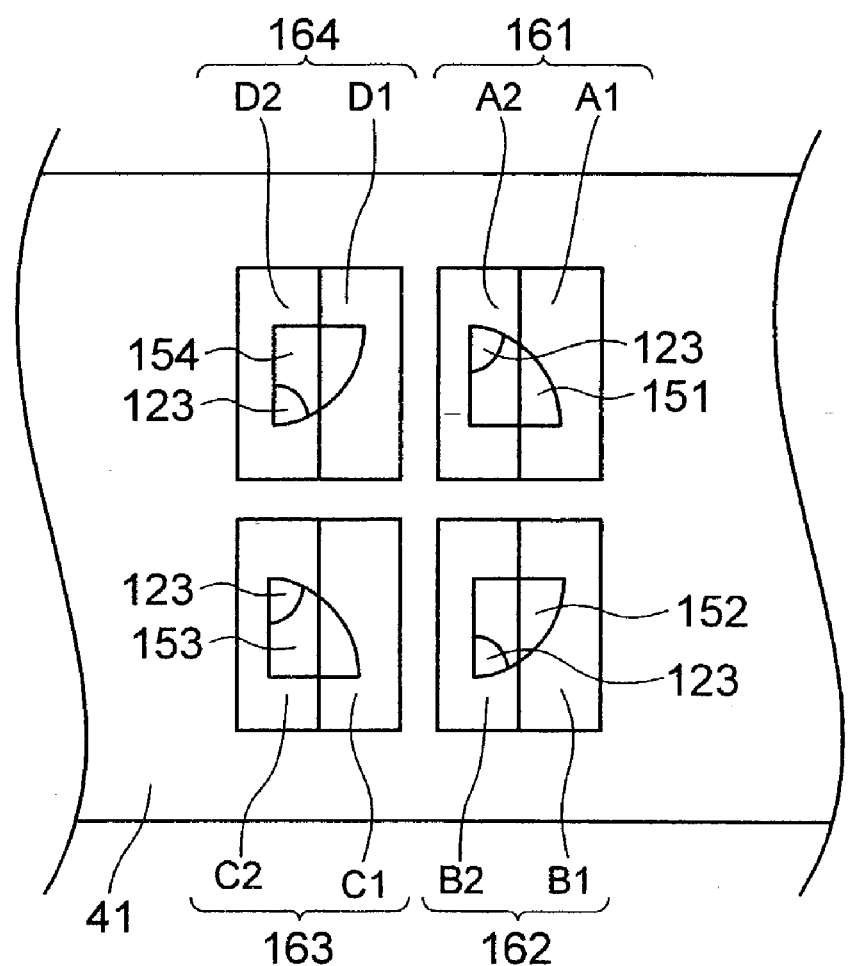
FIG. 15 is a view for explaining a relationship between a return incident beam and tracking control.

Next, explanation will be made of the push-pull process in this embodiment. Referring to FIG. 15 which is a view for explaining a relationship between the incident return beans and the tracking control, as mentioned above, the diffracted return beams 123 come onto the polarizing plate 71, and are then led to the received light detecting part 47 (light receiving patterns 161 to 164) by the quarterly divided hologram zones 131 to 134. Thus, the diffracted return light beams 123 are further split into halves on the light receiving patterns 161 to 164. As mentioned above, since a differential between signals in the hologram zones which are divided by the division line in parallel with the direction T is measured in order to obtain a push-pull signal, a differential between the received light patterns which are divided by the division line in parallel with the direction R is obtained in this case.

That is, the differential is obtained between a group of electrical signals obtained from light quantities which are incident upon the light receiving element A1, the light receiving element A2, the light receiving element B1 and the light receiving element B2, and a group of electrical signals obtained from light quantities which are incident upon the light receiving element C1, the light receiving element C2, the light receiving element D1 and the light receiving element D2. Thus, the push-pull signal PP is obtained by the following formula:

$$PP=(A+B)-(C+D) \quad \text{(Eq. 6)}$$

where A, B, C and D are obtained by Eq. 1 to Eq. 4.

Figure 16A:
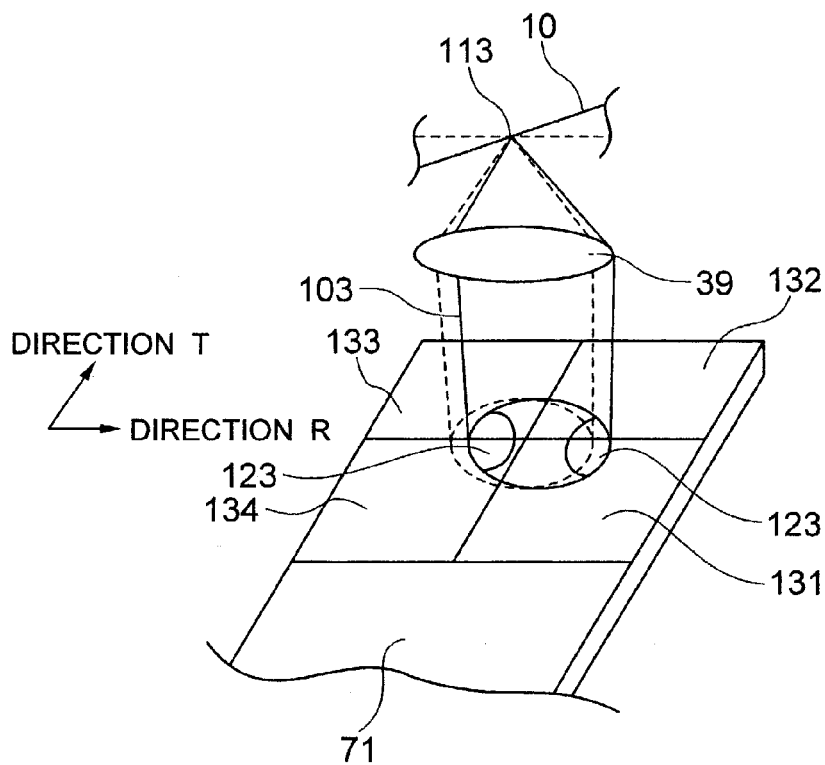
FIGS. 16A and 16B are views for explaining affection in the case of tilting of an optical disc.
Figure 16B:
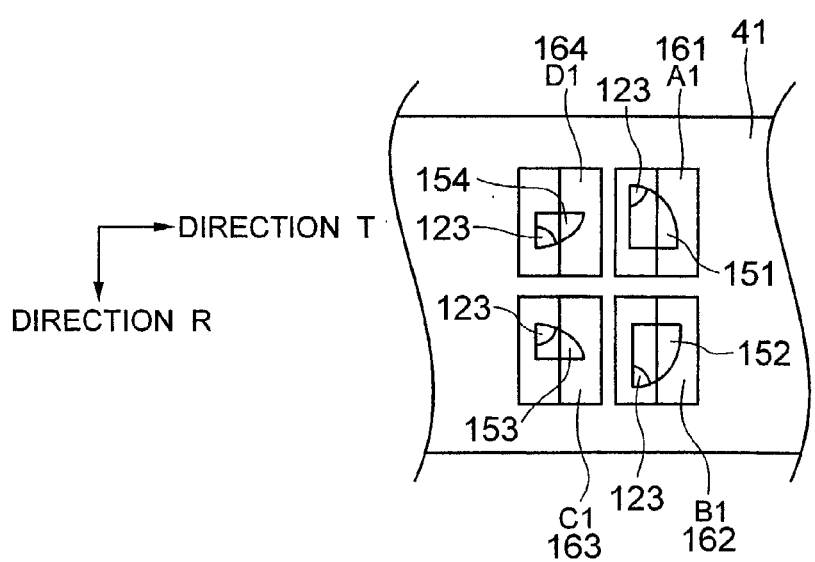

The tracking control method using the pushpull process as stated above will be verified and explained under an actually used environment. Referring to FIGS. 16A to 16B which are views for explaining affection in such a case that the optical disc 10 is tilted, and in which FIG. 16A shows a distribution of an incident return light beam which is incident upon the hologram zones, and FIG. 16B shows affection by the incident return light beams which are incident upon the light receiving patterns, with such an estimation that the optical disc 10 tilts (indicated by the solid line in the figure) in the direction R from a horizontally loaded posture (indicated by the dotted line in the figure), when the disc focus point 113 is reflected at the recording layer of the optical disc 10, the return light beam 103 which is devitated in the direction R in proportion to a tilt angle of the optical disc 10 is returned to the objective lens 39.

The return light beam 103 comes to the hologram zones 131 to 134 while it is still deflected in the direction R after passing through the objective lens 39. As shown in the figure, the center of the return light beam 103 is displaced in the direction R from the cross point between the division lines of the quarterly divided hologram zones 131 to 134, a difference is appreciated between a light quantity incident upon the hologram zones 131, 132 on one hand, and a light quantity incident upon the hologram zones 133, 134, which are divided by the division line in parallel with the direction T.

As a result, as shown in FIG. 16B, an affection is caused to the incident return light subbeams 151 to 154 which come to the light receiving patterns 161 to 164. Referring to FIG. 16B which is a view for explaining the above-mentioned affection, a difference in received light quantity is obtained between the light receiving patterns 161, 162 on one hand, and the light receiving patterns 163, 164 on the other hand, which are divided by the division line in parallel with the direction R. That is, the push-pull signal obtained through computation of the above-mentioned Eq. 6, exhibits a positive electrical signal or a negative electrical signal, depending upon a tilt of the optical signal in the direction R. Thus, irrespective of whether the disc focus point 113 is located on the part between the guide grooves 121 of the disc or not, a tilt of the disc in the direction R causes a tracking offset.

Thus, consideration will be made for the distributions of light on the light receiving elements A1, B1, C1, D1. Referring to FIG. 16B, as stated above, a difference in receive light quantity is appreciated between the light receiving patterns (161, 164) on one hand, and the light receiving patterns (163, 164) on the other hand, which are divided by the division line in parallel with the direction R. In detail, the incident return light beams 153, 154 have small sizes, but the incident return light beams 151, 152 have large sizes. Accordingly, a difference is obtained between an electrical signal obtained by the light quantity incident upon the light receiving elements A1, B1 and an electrical signal obtained by the light quantity incident upon the light receiving elements C1, D1. This difference has a sign which is reversed if the optical disc 10 tilts reversely in the direction R, and the absolute value thereof is also proportional to a tilt angle of the optical disc 10 in the direction R. Accordingly, it can be used as a detection signal indicating a tilt of the optical disc 10 in the direction R.

It is noted that, as shown in FIG. 16B, the light beams incident upon the light receiving elements A1, B1, C1 and D1 do not include the diffracted return beams 123 by the guide grooves 121. Thus, the light receiving elements A1, B1, C1 and D1 are never affected by the guide grooves 121 (tracking). That is, by correcting the push-pull signal (Eq. 6) with the received light signals from the light receiving elements A1, B1, C1 and D1, the correction computation of the light receiving elements A1, B1, C1 and D1 can be used for a tilt detection signal with no affection by the guide grooves 121 (tracking) of the optical disc 10.

Thus, an electrical signal obtained by a light quantities of the incident return light subbeams 151, 152 on the light receiving elements A1, B1 is given by:

$$E=VA1+VB1 \quad \text{(Eq. 7)}$$

similarly, an electrical signal obtained by the light quantities of the incident return subbeams 153, 154 on the light receiving elements C1, D1 is given by:

$$F=VC1+VD1 \quad \text{(Eq. 8)}$$

The tracking control signal TE obtained from Eq. 6, Eq. 7 and Eq. 8, is given by:

$$TE=PP-k\times(E-F) \quad \text{(Eq. 9)}$$

where k is a constant which is determined by an operational setting. Thus, in Eq. 9, a tracking offset caused by a tile of the optical disc 10 in the direction R is taken away for cancel-out. Thus, with the tracking control using the tracking control signal obtained by Eq. 9, control with stably less error can be carried out.

It is noted that the above-mentioned constant k can be determined as follows: In the case of no tilt of the optical disc 10 in the direction R, no offset is caused in both push-pull signal (Eq. 6) and (E–F) (second term in Eq. 9). However, if the optical disc 10 tilts in the direction R, offsets having different values are caused. Usually, the optical disc 10 warping in the direction R exhibits different degrees of warp or different degrees of tilt in the direction R between the inner periphery and the outer periphery of the optical disc 10.

With the use of this difference, at first, an offset of the push-pull signal PP (Eq. 6) and an offset of (E−F) (second term in Eq. 9) are measured at the inner periphery. Next, both offsets at the outer periphery are measured. Further, differences between the offsets at the inner and outer peripheries are obtained, and then, a ratio between the offset of the push-pull signal and the offset of the (E−F) (second term in Eq. 9) is calculated. Thus, the constant k can be determined. If these series steps are carried out once when the optical disc is used, and are stored and subjected to learning, all tilts of the optical disc in the direction R can be processed subsequently with the use of one and the same constant k. Thus, there can be obtained a precise tracking control signal with no affection by a tilt in the direction R.

It is noted that the above-mentioned explanation has been made as to a tilt in the direction R. It is because warping of an optical disc may be exhibited as a tilt in the direction R with the result of rotation of the optical disc, and accordingly, it is sufficient to verify the tilt in the direction R.

Further, verification and explanation will be made of affection by an environmental temperature for the tracking control based upon Eq. 9. In general, if the environmental temperature surrounding the optical disc unit varies, the wavelength of an optical beam emitted from the semiconductor laser 61 varies. If the wavelength of the return light beam incident upon the polarizing plate 71 varies, the diffraction angles of the light subbeams after passing through the hologram zones 131 to 134 in the polarizing plate 71 vary. Thus, the positions of the incident return light subbeams 124, 125 having come onto the received light detecting part 47 are changed.

Figure 17:
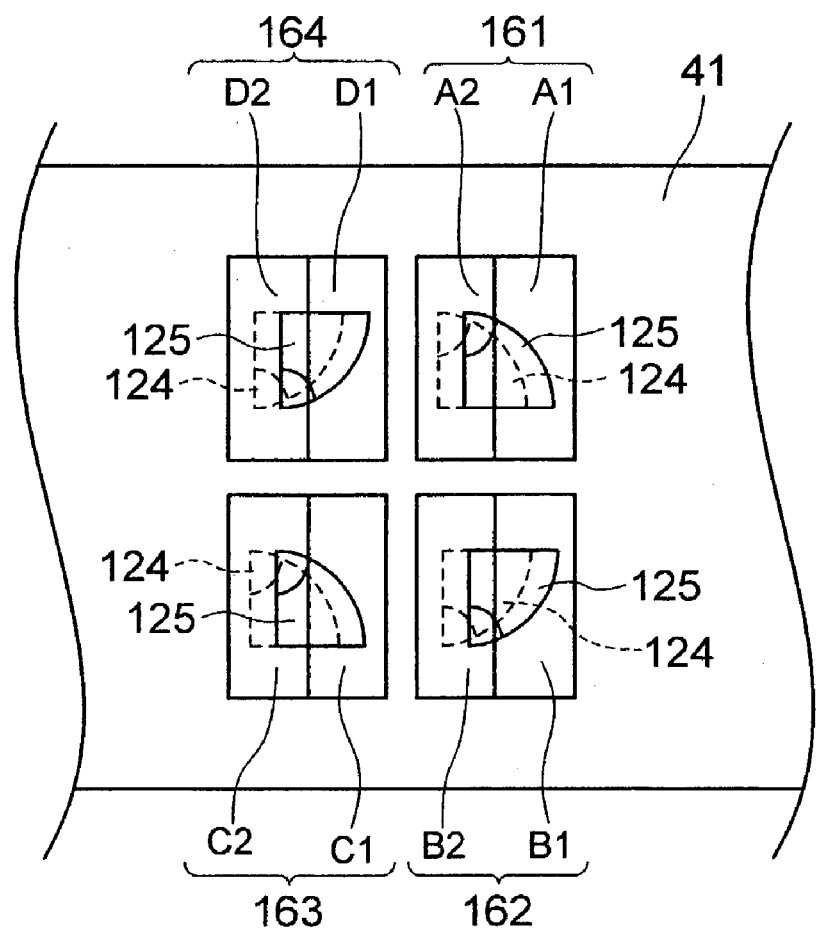
FIG. 17 is a view for explaining affection by temperature variation.

FIG. 17 is a view for explaining the affection by temperature variation, that is, explaining an affection which is exerted to the servo control in such a case that the environmental temperature varies so as to increase the temperature, resulting in increase of the wavelength. At first, the case of no variation in the wavelength of light is exhibited by the dotted line in the figure. The incident return light subbeams 124 from the hologram zones 131 to 134 are incident upon a substantial center of the light receiving patterns 161 to 164 on the OEIC 41. The case of increase in the wavelength of light due to an increased environmental temperature is exhibited by the solid line in the figure. The incident return light subbeams 125 are displaced in the direction T on the light receiving patterns 161 to 164, that is, it is incident thereupon at a position which is deviated from the center of the light receiving patterns 161 to 164. The reason why the diffracted light beam is deviated in the direction T is such that the diffracting direction of the hologram zones 131 to 134 is substantially in the direction T.

Referring to FIG. 17, the received light quantities at the light receiving elements A1, B1, C1 and D1 are increased due to variation of the wavelength (long wavelength variation). On the contrary, the received light quantities at the light receiving elements A2, B2, C2 and D2 are decreased. It is noted that the electrical signal A (Eq. 1) does not substantially vary even thought the environmental temperature varies since the increased received light quantity at the light receiving element A1 is substantially equivalent to the decreased received light quantity at the light receiving element B2. Further, similarly, the electrical signals B (Eq. 2), C (Eq. 3) and D (Eq. 4) do not substantially vary even though the environmental temperature varies. Thus, the focus control signals FE (Eq. 7) and the push-pull signal PP (Eq. 6) which are obtained on the basis of Eq. 1 to Eq. 4, also do not vary even though the environmental temperature varies.

Further, since respective increases in the received light quantities at the light receiving elements A1, B1, C1, D1 are substantially equal to one another, the signal E (Eq. 7) and the signal F (Eq. 8) are not substantially affected by a temperature variation, and further, the electrical signal (E−F) is also not affected by a temperature variation so that it does not vary substantially. With the verification as stated above, it is understood that the tracking control signal TE (Eq. 9) is not affected by a temperature variation, and accordingly, does not vary substantially. Thus, both focus control signal FE (Eq. 5) and the tracking control signal TE (Eq. 9) are not affected by variation in the environmental temperature or variation in the wavelength of light, thereby it is possible to carry out stable focus control and stable tracking control.

It is noted that excitation of the focus coil 25 under focus control, excitation of the tracking coil 24 under tracking control and laser power control for the semiconductor laser 61 based upon the monitor light receiving part 44 can be simply materialized by servo control, a coil excitation circuit and the like which have been well-known. Since the content of the technology does not constitute the subject of the present invention, the explanation thereof will be omitted with such a suggestion that it can be carried out by a well-known technology.

As stated above, according to the present invention, there can be provided a focus and tracking control method for an optical pick-up apparatus, and an optical disc unit using the control method, which can carry out focus control and tracking control without affection by a tilt of an optical disc and affection by variation in environmental temperature.

What is claimed is:

1. An optical pick-up apparatus for recording and reproducing data onto and from a recording medium, the apparatus comprising:

a light source;

an objective lens that focuses a light beam from the light source on the recording medium;

a light receiving section, having first through fourth light receiving zones which are divided by a line in parallel with a radial direction of the recording medium and a line in parallel with a tangential direction of the recording medium, that receives a reflected light beam from the recording medium;

a polarizing section, having a diffraction grating which is divided into first through fourth lattice zones by a line in parallel with the radial direction and a line in parallel with the tangential direction and located between the objective lens and the light receiving section, that guides the reflected light beam from the recording medium to the first through fourth light receiving zones of the light receiving section; and a control section that carries out focus control and tracking control to the objective lens in accordance with the reflected light beam received by the light receiving section, wherein:

the first light receiving zone comprises first and second light receiving elements which are separated from each other in the tangential direction by a line in parallel with the radial direction, the second light receiving zone comprises third and fourth light receiving elements which are separated from each other in the tangential direction by a line in parallel with the radial direction, the third light receiving zone comprises fifth and sixth light receiving elements which are separated from each other in the tangential direction by a line in parallel with the radial direction, the fourth light receiving zone comprises seventh and eighth light receiving elements which are separated from each other in the tangential direction by a line in parallel with the radial direction, the control section carries out the focus control in accordance with four differential signals, that is, a differential signal between the first and second light receiving elements, a differential signal between the third and fourth light receiving elements, a differential signal between the fifth and sixth light receiving elements, and a differential signal between the seventh and eighth light receiving elements, which are produced from the reflected light beam received in the eight receiving elements in such a way that a split beam obtained by splitting the reflected light beam through the first lattice zone is led to the seventh and eighth light receiving elements or the first and second light receiving elements, a split beam obtained by splitting the reflected light beam through the second lattice zone is led to the first and second light receiving elements or the seventh and eighth light receiving elements, a split beam obtained by splitting the reflected light beam through the third lattice zone is led to the third and fourth light receiving elements or the fifth and sixth light receiving elements, and a split beam obtained by splitting the reflected light beam through the fourth lattice zone is led to the fifth and sixth light receiving elements or the third and fourth light receiving elements, and the control section carries out the tracking control in accordance with the reflected light beam which is received by the four light receiving zones in such a way that a split beam obtained by splitting the reflected light beam through the first lattice zone is led to the first and second light receiving elements, a split beam obtained by splitting the reflected light beam through the second lattice zone is led to the third and fourth light receiving elements, a split beam obtained by splitting the reflected light beam through the third lattice zone is led to the fifth and sixth light receiving elements, and a split beam obtained by splitting the reflected light beam through the fourth lattice zone is led to the seventh and eighth light receiving elements.

2. An optical disc apparatus as set forth in claim 1, wherein the focus control is carried out so that a focus control signal exhibited by the following formula:

$$FE=(A1+B2+D1+C2)-(A2+B1+D2+C1)$$

is set to zero, where:
- $A1$ is a characteristic of the light received by the first light receiving element,
- $A2$ is a characteristic of the light received by the second light receiving element,
- $B1$ is a characteristic of the light received by the third light receiving element,
- $B2$ is a characteristic of the light received by the fourth light receiving element,
- $C1$ is a characteristic of the light received by the fifth light receiving element,
- $C2$ is a characteristic of the light received by the sixth light receiving element,
- $D1$ is a characteristic of the light received by the seventh light receiving element, and
- $D2$ is a characteristic of the light received by the eighth light receiving element.

3. An optical apparatus as set forth in claim 1, wherein the tracking control is carried out so that a tracking control signal exhibited by the following formula:

$$TE=((A1+A2+B1+B2)-(C1+C2+D1+D2))-k((A1+B1)-(C1+D1))$$

is set to zero, where:
- $A1$ is a characteristic of the light received by the first light receiving element,
- $A2$ is a characteristic of the light received by the second light receiving element,
- $B1$ is a characteristic of the light received by the third light receiving element,
- $B2$ is a characteristic of the light received by the fourth light receiving element,
- $C1$ is a characteristic of the light received by the fifth light receiving element,
- $C2$ is a characteristic of the light received by the sixth light receiving element,
- $D1$ is a characteristic of the light received by the seventh light receiving element,
- $D2$ is a characteristic of the light received by the eighth light receiving element, and
- $k$ is a factor which is determined by operation setting through one time actual operation of the optical disc apparatus in order to obtain offsets at outer and inner peripheries of an optical disc, in accordance with a proportion between an offset in the first term and an offset in the second term with the TE formula.

* * * * *